US007956145B2

(12) United States Patent
Osakada et al.

(10) Patent No.: US 7,956,145 B2
(45) Date of Patent: Jun. 7, 2011

(54) DIENE POLYMER AND PROCESS FOR PRODUCING THE SAME

(75) Inventors: Kohtaro Osakada, Yokohama (JP); Daisuke Takeuchi, Yokohama (JP); Sehoon Park, Yokohama (JP); Makoto Uemura, Chiba (JP); Masayuki Fujita, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 618 days.

(21) Appl. No.: 11/958,905

(22) Filed: Dec. 18, 2007

(65) Prior Publication Data

US 2008/0234450 A1 Sep. 25, 2008

(30) Foreign Application Priority Data

Feb. 28, 2007 (JP) ................................. 2007-048396

(51) Int. Cl.
*C08F 236/02* (2006.01)
*C08F 32/02* (2006.01)
(52) U.S. Cl. ......... 526/336; 526/308; 526/161; 502/162
(58) Field of Classification Search .................. 526/308, 526/336, 161; 502/162
See application file for complete search history.

(56) References Cited

U.S. PATENT DOCUMENTS

| 5,571,850 | A | 11/1996 | Ma et al. |
| 5,631,345 | A | 5/1997 | Takaya et al. |
| 6,175,047 | B1 | 1/2001 | Hori et al. |
| 6,995,226 | B2 | 2/2006 | Taguchi et al. |
| 2004/0024137 | A1 | 2/2004 | Kusudou et al. |
| 2004/0152843 | A1 | 8/2004 | Taguchi et al. |
| 2008/0214754 | A1 | 9/2008 | Osakada et al. |
| 2008/0214755 | A1 | 9/2008 | Osakada et al. |
| 2008/0214756 | A1 | 9/2008 | Osakada et al. |
| 2008/0221286 | A1 | 9/2008 | Osakada et al. |
| 2008/0221287 | A1 | 9/2008 | Osakada et al. |
| 2008/0221288 | A1 | 9/2008 | Osakada et al. |

FOREIGN PATENT DOCUMENTS

| JP | 2001-29794 A | 2/2001 |
| JP | 2006-193708 A | 7/2006 |
| WO | 96/23010 A1 | 8/1996 |
| WO | 99/05189 A1 | 2/1999 |
| WO | 2007/023618 A1 | 3/2007 |

OTHER PUBLICATIONS

Takeuchi et al. "Cyclopolymerization of 1,6-Heptadienes Catalyzed by Iron and Cobalt complexes: Synthesis of Polymers with Trans- or Cis-Fused 1,2-Cyclopentanediyl Groups Depending on the catalyst", J. Am. Chem. Soc., 129, 7002-7003 (2007).*

Masayuki Fujita et al. "Synthesis and Characterization of Alternating and Multiblock Copolymers for Ethylene and Cyclopentene", Macromolecules, vol. 35, pp. 9640-9647, (2002).
Laurel A. Goj et al., "Mechanistic Studies of the Cycloisomerization of Dimethy Diallylmalonate Catalyzed by a Cationic Palladium Phenanthroline Complex", J. Am. Chem. Soc., vol. 123, pp. 11133-11147, (2001).
Nicholas S. Perch et al., "Mechanism of Palladium-Catalyzed Diene Cyclization/Hydrosilylation: Direct Observation of Intramolecular Carbometalation", J. Am. Chem., vol. 126, pp. 6332-6346, (2004).
Sehoon Park et al., "Cyclization Polymerization of Diallylmalonates and Copolymerization with Ethylene Catalyzed by Palladium Complexes", Polymer Preprints, Japan, vol. 54, No. 2, pp. 2570 w/attachment, (2005).
Sehoon Park et al., "Pd Complex-Promoted Cyclopolymerization of Functionalized α,ω-Dienes and Copolymerization with Ethylene to Afford Polymers with Cyclic Repeating Units", J. Am. Chem. Soc., vol. 128, pp. 3510-3511, (2006).
Takeshi Okada et al.; "Pd-Catalyzed Polymerization of Dienes that Involves Chain-Walking Isomerization of the Growing Polymer End: Synthesis of Polymers Composed of Polymethylene and Five-Membered-Ring Units"; Angew. Chem Int.Ed.; vol. 46; pp. 6141-6143 (2007).
Geoffrey W. Coates et al.; "Chiral polymers via cyclopolynnerization"; Journal of Molecular Catalysis; vol. 76; pp. 189-194 (1992).
U.S. Appl. No. 11/959,940, filed Dec. 19, 2007.
U.S. Appl. No. 12/064,399, filed Feb. 27, 2009.
U.S. Appl. No. 12/372,815, filed Feb. 18, 2009.
Daisuke Takeuchi et al., "Cyclopolymerization of 1,6-Heptadienes Catalyzed by Iron and Cobalt Complexes: Synthesis of Polymers with Trans-or Cis-Fused 1,2-Cyclopentanediyl Groups Depending on the Catalyst", J. Am. Chem. Soc., vol. 129, No. 22, pp. 7002-7003, (2007).
U.S. Office Action issued Sep. 16, 2010 in U.S. Appl. No. 11/946,939.
U.S. Office Action issued Sep. 16, 2010 in U.S. Appl. No. 12/036,231.
Gomez, et al.: "Aryloxide ligand modification: new classical catalytic systems for olefin metathesis"; Journal of Molecular Catalysis A: Chemical; 160; pp. 145-156 (2000).
U.S. Office Action issued Sep. 16, 2010 in U.S. Appl. No. 12/036,230.
U.S. Office Action issued Sep. 16, 2010 in U.S. Appl. No. 11/957,859.
U.S. Office Action issued Sep. 16, 2010 in U.S. Appl. No. 11/958,438.
U.S. Office Action issued Dec. 1, 2010 in U.S. Appl. No. 12/064,399.
STN Search Results dated Nov. 17, 2010 attached to Office Action issued Dec. 1, 2010 in U.S. Appl. No. 12/064,399.
U.S. Office Action dated Sep. 16, 2010 in U.S. Appl. No. 12/036,233.

* cited by examiner

*Primary Examiner* — Ling-Siu Choi
(74) *Attorney, Agent, or Firm* — Panitch Schwarze Belisario & Nadel LLP

(57) ABSTRACT

A polymer containing units represented by the defined formula (1); and a process for producing the polymer, which comprises the step of polymerizing a compound represented by the defined formula (3), the units represented by the formula (1) being polymerized units of the compound represented by the formula (3) such as 9,9-diallylfluorene.

12 Claims, No Drawings

DIENE POLYMER AND PROCESS FOR PRODUCING THE SAME

FIELD OF THE INVENTION

The present invention relates to a diene polymer having a superior balance between a heat resistance and a refractive index, and a process for producing the diene polymer.

BACKGROUND OF THE INVENTION

There cannot be obtained diene polymers having a superior balance between a heat resistance and workability, by means of polymerizing non-conjugated diene compounds such as 9,9-diallylfluorene represented by the hereinafter-mentioned formula (3) having two carbon-to-carbon double bonds, in the presence of a commonly-used addition polymerization catalyst. The reason is that one of the two carbon-to-carbon double bonds is involved in not an addition polymerization reaction but an undesirable reaction such as a cross-linking reaction, although another carbon-to-carbon double bond is involved in an addition polymerization reaction, and as a result, there is obtained only a polymer, which (i) has no cyclic structure in its main chain contributing to a heat resistance, and (ii) is not necessarily a thermoplastic polymer contributing to workability.

On the other hand, Macromolecules, Vol. 35, pages 9640-9647 (2002) discloses a preparation method of an ethylene-cyclopentane alternating copolymer having a superior heat resistance due to a cyclic structure contained in its main chain, the method comprising the steps of (a) copolymerizing ethylene with cyclopentene by coordination ring-opening polymerization, thereby obtaining an alternating copolymer having carbon-to-carbon double bonds in its main chain, and (b) hydrogenating those carbon-to-carbon double bonds, thereby obtaining an ethylene-cyclopentane alternating copolymer. However, the above-mentioned preparation method has a problem in that (i) it is not easy to synthesize a monomer for preparing a target substituent-carrying alternating copolymer, and (ii) even if such a monomer can be synthesized, the above-mentioned hydrogenation step (b) may unfavorably hydrogenate also those substituents in an alternating copolymer obtained in the above-mentioned copolymerization step (a).

SUMMARY OF THE INVENTION

In view of the above-mentioned circumstances, the present invention has an object to provide a diene polymer having a superior balance between a heat resistance and a refractive index and a process for producing the diene polymer.

The present invention is a polymer containing units represented by the following formula (1):

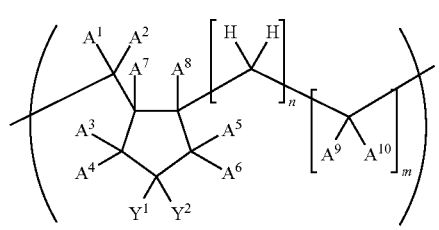

(1)

wherein $Y^1$ is an aryl group, and $Y^2$ is an aryl group, a hydrogen atom, a halogen atom, an alkyl group, an aralkyl group, a silyl group, a siloxy group, an alkoxy group, an aralkyloxy group, an aryloxy group, an amino group, an amide group, an imide group, or a hydrocarbylthio group; $Y^1$ and $Y^2$ may be linked with each other to form a ring; $A^1, A^2, A^3, A^4, A^5, A^6, A^7, A^8, A^9$ and $A^{10}$ are independently of one another a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group; m is 0 or 1; and n is an integer of 1 to 20.

Also, the present invention is a process for producing a polymer containing units represented by the above formula (1), which comprises the step of polymerizing a compound represented by the following formula (3):

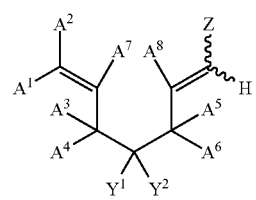

(3)

wherein Z is a group of —$(CH_2)_{n-1}$—$(CA^9A^{10})_m$H; two wavy lines displayed in the upper right of the formula (3) mean variety in their configuration; and $Y^1, Y^2, A^1$ to $A^{10}$, m and n are the same as those defined in the formula (1).

In the present invention, the term "unit" contained in the above-mentioned "units represented by the formula (1)" means a polymerization unit of a monomer such as a compound represented by the formula (3).

DETAILED DESCRIPTION OF THE INVENTION

Examples of the aryl group of $Y^1$ and $Y^2$ in the above formulas are a phenyl group, a tolyl group and a mesityl group. The aryl group may have a substituent such as a halogen atom, a hydrocarbyloxy group, a nitro group, a sulfonate group, a silyl group, and a cyano group.

Examples of the halogen atom of $Y^2$ in the above formulas are a fluorine atom, a chlorine atom, a bromine atom, and an iodine atom. Among them, preferred is a fluorine atom.

Examples of the alkyl group of $Y^2$ in the above formulas are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group.

Examples of the aralkyl group of $Y^2$ in the above formulas are a benzyl group, a phenethyl group, a 2-methylbenzyl group, a 3-methylbenzyl group, a 4-methylbenzyl group, a 2,6-dimethylbenzyl group, and a 3,5-dimethylbenzyl group. The aralkyl group may have a substituent such as a halogen atom, a hydrocarbyloxy group, a nitro group, a sulfonate group, a silyl group, and a cyano group.

Examples of the silyl group of $Y^2$ in the above formulas are mono-substituted silyl groups such as a methylsilyl group, an ethylsilyl group, and a phenylsilyl group; di-substituted silyl groups such as a dimethylsilyl group, a diethylsilyl group, and a diphenylsilyl group; and tri-substituted silyl groups such as a trimethylsilyl group, a trimethoxysilyl group, a dimethylmethoxysilyl group, a methyldimethoxysilyl group, a triethylsilyl group, a triethoxysilyl group, a tri-n-propylsilyl group, a triisopropylsilyl group, a tri-n-butylsilyl group, a tri-sec-butylsilyl group, a tert-butyldimethylsilyl group, a triisobutylsilyl group, a tert-butyldiphenylsilyl group, a cyclohexyldimethylsilyl group, a tricyclohexylsilyl group, and a triphenylsilyl group. The silyl group may have a substituent such as a halogen atom, a hydrocarbyloxy group, a nitro group, a sulfonate group, and a cyano group.

Examples of the siloxy group of $Y^2$ in the above formulas are a trimethylsiloxy group, a trimethoxysiloxy group, a dimethylmethoxysiloxy group, a methyldimethoxysiloxy group, a triethylsiloxy group, a triethoxysiloxy group, a tri-n-propylsiloxy group, a triisopropylsiloxy group, a tri-n-butylsiloxy group, a tri-sec-butylsiloxy group, a tert-butyldimethylsiloxy group, a triisobutylsiloxy group, a tert-butyldiphenylsiloxy group, a cyclohexyldimethylsiloxy group, a tricyclohexylsiloxy group, and a triphenylsiloxy group. The siloxy group may have a substituent such as a halogen atom, a hydrocarbyloxy group, a nitro group, a sulfonate group, and a cyano group.

Examples of the alkoxy group of $Y^2$ in the above formulas are linear alkoxy groups such as a methoxy group, an ethoxy group, and a n-butoxy group; branched alkoxy groups such as an isopropoxy group, an isobutoxy group, a tert-butoxy group, and a neopentoxy group; and cyclic alkoxy groups such as a cyclohexyloxy group and a cyclooctyloxy group. The alkoxy group may have a substituent such as a halogen atom, a hydrocarbyloxy group, a nitro group, a sulfonate group, a silyl group, and a cyano group.

Examples of the aralkyloxy group of $Y^2$ in the above formulas are a benzyloxy group, a phenethyloxy group, a 2-methylbenzyloxy group, a 3-methylbenzyloxy group, a 4-methylbenzyloxy group, a 2,6-dimethylbenzyloxy group, and a 3,5-dimethylbenzyloxy group. The aralkyloxy group may have a substituent such as a halogen atom, a hydrocarbyloxy group, a nitro group, a sulfonate group, a silyl group, and a cyano group.

Examples of the aryloxy group of $Y^2$ in the above formulas are a phenoxy group, a 2-methylphenoxy group, a 2-ethylphenoxy group, a 2-n-propylphenoxy group, a 2-isopropylphenoxy group, a 2-n-butylphenoxy group, a 2-isobutylphenoxy group, a 2-tert-butylphenoxy group, a 3-methylphenoxy group, a 3-isopropylphenoxy group, a 3-n-butylphenoxy group, a 3-tert-butylphenoxy group, a 4-methylphenoxy group, a 4-isopropylphenoxy group, a 4-n-butylphenoxy group, a 4-tert-butylphenoxy group, a 2,3-dimethylphenoxy group, a 2,4-dimethylphenoxy group, a 2,5-dimethylphenoxy group, a 2,6-dimethylphenoxy group, a 3,5-dimethylphenoxy group, a 2,6-diisopropylphenoxy group, a 2,6-di-tert-butylphenoxy group, and a naphthoxy group. The aryloxy group may have a substituent such as a halogen atom, a hydrocarbyloxy group, a nitro group, a sulfonate group, a silyl group, and a cyano group.

Examples of the amino group of $Y^2$ in the above formulas are linear alkylamino groups such as an N,N-dimethylamino group, an N,N-diethylamino group, and an N,N-di-n-butylamino group; branched alkylamino groups such as an N,N-diisopropylamino group, an N,N-diisobutylamino group, an N,N-di-tert-butylamino group, and an N,N-dineopentylamino group; and cyclic alkylamino groups such as an N,N-dicyclohexylamino group and an N,N-dicyclooctylamino group.

Examples of the amide group of $Y^2$ in the above formulas are an ethanamide group, an N-n-butylethanamide group, an N-methylethanamide group, an N-ethylethanamide group, an N-n-butylhexanamide group, an isopropanamide group, an isobutanamide group, a tert-butanamide group, a neopentanamide group, a cyclohexanamide group, and a cyclooctanamide group. The amide group may have a substituent such as a halogen atom, a hydrocarbyloxy group, a nitro group, a sulfonate group, a silyl group, and a cyano group.

Examples of the imide group of $Y^2$ in the above formulas are a succinimide group, a maleimide group, and a phthalimide group. The imide group may have a substituent such as a halogen atom, a hydrocarbyloxy group, a nitro group, a sulfonate group, a silyl group, and a cyano group.

Examples of the hydrocarbylthio group of $Y^2$ in the above formulas are linear alkylthio groups such as a methylthio group, an ethylthio group, and a n-butylthio group; branched alkylthio groups such as an isopropylthio group, an isobutylthio group, a tert-butylthio group, and a neopentylthio group; and cyclic alkylthio groups such as a cyclohexylthio group and a cyclooctylthio group.

Among them, $Y^2$ is preferably an aryl group, and it is more preferable that $Y^2$ is an aryl group linked to $Y^1$ to form a ring.

When $Y^1$ and $Y^2$ in the above formulas are linked to each other to form a ring, an example of the ring is an aromatic ring. The ring may have one or more substituents. Examples of a divalent group in an aromatic ring formed by a linkage between $Y^1$ and $Y^2$ are a biphenyl-2,2'-diyl group, a biphenyl ether-2,2'-diyl group, a biphenyl thioether-2,2'-diyl group, an isopropylidenediphenyl-2,2'-diyl group, a diphenylsilylenediphenyl-2,2'-diyl group, a naphthyl-1,8-diyl group, a phenanthrenyl-4,5-diyl group, a 1,2-dimethylenephenyl group, a 1,3-dimethylenephenyl group, a 1,4-dimethylenephenyl group, a 1,2-diethylenephenyl group, a 1,3-diethylenephenyl group, and a 1,4-diethylenephenyl group.

Examples of the halogen atom of $A^1$ to $A^{10}$ in the above formulas are a fluorine atom, a chlorine atom, a bromine atom, and an iodine atom. Among them, preferred is a fluorine atom.

Examples of the alkyl group of $A^1$ to $A^{10}$ in the above formulas are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group. The alkyl group may have a substituent such as a halogen atom, a hydrocarbyloxy group, a nitro group, a sulfonate group, and a cyano group.

Examples of the aralkyl group of $A^1$ to $A^{10}$ in the above formulas are a benzyl group, a phenethyl group, a 2-methylbenzyl group, a 3-methylbenzyl group, a 4-methylbenzyl group, a 2,6-dimethylbenzyl group, and a 3,5-dimethylbenzyl group. The aralkyl group may have a substituent such as a halogen atom, a hydrocarbyloxy group, a nitro group, a sulfonate group, a silyl group, and a cyano group.

Examples of the aryl group of $A^1$ to $A^{10}$ in the above formulas are a phenyl group, a tolyl group and a mesityl group. The aryl group may have a substituent such as a halogen atom, a hydrocarbyloxy group, a nitro group, a sulfonate group, a silyl group, and a cyano group.

Examples of the silyl group of $A^1$ to $A^{10}$ in the above formulas are mono-substituted silyl groups such as a methylsilyl group, an ethylsilyl group, and a phenylsilyl group; di-substituted silyl groups such as a dimethylsilyl group, a diethylsilyl group, and a diphenylsilyl group; and tri-substituted silyl groups such as a trimethylsilyl group, a trimethoxysilyl group, a dimethylmethoxysilyl group, a methyldimethoxysilyl group, a triethylsilyl group, a triethoxysilyl group, a tri-n-propylsilyl group, a triisopropylsilyl group, a tri-n-butylsilyl group, a tri-sec-butylsilyl group, a tert-butyldimethylsilyl group, a triisobutylsilyl group, a tert-butyldiphenylsilyl group, a cyclohexyldimethylsilyl group, a tricyclohexylsilyl group, and a triphenylsilyl group. The silyl group may have a substituent such as a halogen atom, a hydrocarbyloxy group, a nitro group, a sulfonate group, and a cyano group.

Examples of the siloxy group of $A^1$ to $A^{10}$ in the above formulas are a trimethylsiloxy group, a trimethoxysiloxy group, a dimethylmethoxysiloxy group, a methyldimethoxysiloxy group, a triethylsiloxy group, a triethoxysiloxy group, a tri-n-propylsiloxy group, a triisopropylsiloxy group, a tri-n-butylsiloxy group, a tri-sec-butylsiloxy group, a tert-butyldimethylsiloxy group, a triisobutylsiloxy group, a tert-butyldiphenylsiloxy group, a cyclohexyldimethylsiloxy group, a tricyclohexylsiloxy group, and a triphenylsiloxy group. The siloxy group may have a substituent such as a halogen atom, a hydrocarbyloxy group, a nitro group, a sulfonate group, and a cyano group.

Examples of the alkoxy group of $A^1$ to $A^{10}$ in the above formulas are linear alkoxy groups such as a methoxy group, an ethoxy group, and a n-butoxy group; branched alkoxy groups such as an isopropoxy group, an isobutoxy group, a tert-butoxy group, and a neopentoxy group; and cyclic alkoxy groups such as a cyclohexyloxy group and a cyclooctyloxy group. The alkoxy group may have a substituent such as a halogen atom, a hydrocarbyloxy group, a nitro group, a sulfonate group, a silyl group, and a cyano group.

Examples of the aralkyloxy group of $A^1$ to $A^{10}$ in the above formulas are a benzyloxy group, a phenethyloxy group, a 2-methylbenzyloxy group, a 3-methylbenzyloxy group, a 4-methylbenzyloxy group, a 2,6-dimethylbenzyloxy group, and a 3,5-dimethylbenzyloxy group. The aralkyloxy group may have a substituent such as a halogen atom, a hydrocarbyloxy group, a nitro group, a sulfonate group, a silyl group, and a cyano group.

Examples of the aryloxy group of $A^1$ to $A^{10}$ in the above formulas are a phenoxy group, a 2-methylphenoxy group, a 2-ethylphenoxy group, a 2-n-propylphenoxy group, a 2-isopropylphenoxy group, a 2-n-butylphenoxy group, a 2-isobutylphenoxy group, a 2-tert-butylphenoxy group, a 3-methylphenoxy group, a 3-isopropylphenoxy group, a 3-n-butylphenoxy group, a 3-tert-butylphenoxy group, a 4-methylphenoxy group, a 4-isopropylphenoxy group, a 4-n-butylphenoxy group, a 4-tert-butylphenoxy group, a 2,3-dimethylphenoxy group, a 2,4-dimethylphenoxy group, a 2,5-dimethylphenoxy group, a 2,6-dimethylphenoxy group, a 3,5-dimethylphenoxy group, a 2,6-diisopropylphenoxy group, a 2,6-di-tert-butylphenoxy group, and a naphthoxy group. The aryloxy group may have a substituent such as a halogen atom, a hydrocarbyloxy group, a nitro group, a sulfonate group, a silyl group, and a cyano group.

Examples of the amino group of $A^1$ to $A^{10}$ in the above formulas are linear alkylamino groups such as an N-methylamino group, an N-ethylamino group, an N-n-butylamino group, an N,N-dimethylamino group, an N,N-diethylamino group, and an N,N-di-n-butylamino group; branched alkylamino groups such as an N,N-diisopropylamino group, an N,N-diisobutylamino group, an N,N-di-tert-butylamino group, and an N,N-dineopentylamino group; and cyclic alkylamino groups such as an N,N-dicyclohexylamino group and an N,N-dicyclooctylamino group. The amino group may have a substituent such as a halogen atom, a hydrocarbyloxy group, a nitro group, a sulfonate group, and a cyano group.

Examples of the amide group of $A^1$ to $A^{10}$ in the above formulas are an ethanamide group, an N-n-butylethanamide group, an N-methylethanamide group, an N-ethylethanamide group, an N-n-butylhexanamide group, an isopropanamide group, an isobutanamide group, a tert-butanamide group, a neopentanamide group, a cyclohexanamide group, and a cyclooctanamide group.

Examples of the imide group of $A^1$ to $A^{10}$ in the above formulas are a succinimide group, a maleimide group, and a phthalimide group. The imide group may have a substituent such as a halogen atom, a hydrocarbyloxy group, a nitro group, a sulfonate group, and a cyano group.

Examples of the hydrocarbylthio group of $A^1$ to $A^{10}$ in the above formulas are linear alkylthio groups such as a methylthio group, an ethylthio group, and a n-butylthio group; branched alkylthio groups such as an isopropylthio group, an isobutylthio group, a tert-butylthio group, and a neopentylthio group; and cyclic alkylthio groups such as a cyclohexylthio group and a cyclooctylthio group. The hydrocarbylthio group may have a substituent such as a halogen atom, a hydrocarbyloxy group, a nitro group, a sulfonate group, and a cyano group.

Among them, $A^1$ to $A^{10}$ are preferably a hydrogen atom, a halogen atom, or an alkyl group having 1 to 10 carbon atoms; more preferably a hydrogen atom or a methyl group; and further preferably a hydrogen atom.

$A^3$ and $A^4$, or $A^5$ and $A^6$ may be linked with each other to form a ring. Examples of the ring are aliphatic rings such as a cyclobutane ring, a cyclopentane ring and a cyclohexane ring, and aromatic rings. Those rings may have a substituent such as a halogen atom, a hydrocarbyloxy group, a nitro group, a sulfonate group, and a cyano group.

A relative configuration between $A^7$ and $A^8$ in the formula (1) is not particularly limited. The configuration is preferably a trans-form represented by the following formula (2), in order to improve a heat resistance of the diene polymer of the present invention; and from a viewpoint of an excellent heat resistance of the diene polymer, the unit represented by the formula (2) is contained in the diene polymer in an amount of preferably 50% by mol or larger, and more preferably 95% by mol or larger, the total amount of the unit represented by the formula (1) being 100% by mol:

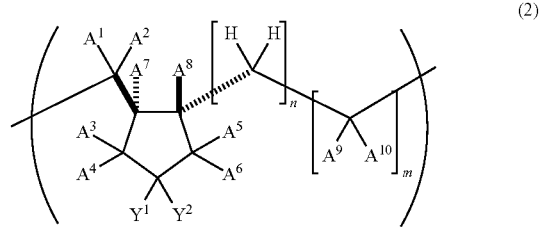

wherein all the symbols contained in the formula (2) are the same as those defined in the formula (1).

A proportion of the above-mentioned trans-form is measured with a $^{13}$C-NMR spectrum, which is obtained using a chloroform-$d_1$ solution of the polymer of the present invention. A peak (i) appearing at 45 to 48 ppm in the $^{13}$C-NMR spectrum is assigned to carbon atoms having a trans-form configuration, and a peak (ii) appearing at 39 to 42 ppm therein is assigned to carbon atoms having a cis-form configuration, provided that a peak assigned to chloroform-$d_1$ appears at 77 ppm. Therefore, the proportion (% by mol) of the trans-form is obtained from the following formula:

proportion (% by mol) of trans-form=area of peak (i)×100/[area of peak (i)+area of peak (ii)].

Stereoregularity of the polymer of the present invention is determined by an absolute configuration of the two asymmetric carbon atoms, which are linked to $A^7$ and $A^8$, respectively, and exist in the main chain of the polymer having the unit represented by the formula (1). There are four kinds of polymers in view of said stereoregularity, (a) an erythrodiisotactic polymer, (b) an erythrodisyndiotactic polymer, (c) a threodiisotactic polymer, and (d) a threodisyndiotactic polymer, as shown in the following formulas:

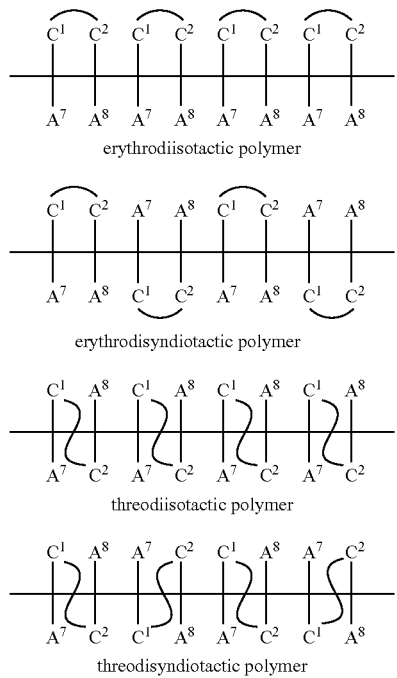

wherein $C^1$ means a carbon atom linked to $A^3$ and $A^4$ in the formula (1); $C^2$ means a carbon atom linked to $A^5$ and $A^6$ therein; a curved line between $C^1$ and $C^2$ corresponds to the tree bonds existing between the carbon atom linked to $A^3$ and $A^4$ and the carbon atom linked to $A^5$ and $A^6$; and other carbon atoms and other substituents contained in the unit represented by the formula (1) are abbreviated.

The above-mentioned four kinds of polymers are defined in Encyclopedia of Polymer Science and Engineering (USA), 2nd Ed., Vol. 10, pages 191-203, John Wiley & Sons, 1987.

Stereoregularity of the polymer of the present invention is not particularly limited. From a viewpoint of production of a polymer excellent in its heat resistance, the polymer of the present invention is (i) a polymer having an erythrodiisotactic triad or a threodiisotactic triad in an amount of preferably more than 25% by mol, more preferably 30% by mol or more, and further preferably 50% by mol or more, the total amount of the unit represented by the formula (1) being 100% by mol, or (ii) a polymer having an erythrodisyndiotactic triad or a threodisyndiotactic triad in an amount of preferably more than 25% by mol, more preferably 30% by mol or more, and further preferably 50% by mol or more, the total amount of the unit represented by the formula (1) being 100% by mol.

The above-mentioned stereoregularity is determined with a $^{13}$C-NMR spectrum obtained by use of a solution of the polymer of the present invention in chloroform-$d_1$. A peak (iii) appearing at 46.2 to 46.6 ppm in the $^{13}$C-NMR spectrum is assigned to carbon atoms derived from a threodiisotactic triad, and a peak (iv) appearing at 46.9 to 47.3 ppm therein is assigned to carbon atoms derived from a threodisyndiotactic triad, provided that a peak assigned to chloroform-$d_1$ appears at 77 ppm.

Therefore, a proportion (%) of the above-mentioned threodiisotactic triad is derived form the following formula:

Proportion (%) of threodiisotactic triad=area of peak (*iii*)×100/[area of peak (*iii*)+area of peak (*iv*)];

and a proportion (%) of the above-mentioned threodisyndiotactic triad is derived form the following formula:

Proportion (%) of threodisyndiotactic triad=area of peak (*iv*)×100/[area of peak (*iii*)+area of peak (*iv*)].

Z in the formula (3) is preferably a hydrogen atom (m=0 and n=1), or an alkyl group having 1 to 20 carbon atoms (m=1, n=1 to 20, $A^9$=H, and $A^{10}$=H).

Compounds represented by the formula (3) may be known in the art. Preferable examples thereof are 9,9-diallylfluorene, 2,7-di-tert-butyl-9,9-diallylfluorene, 2,7-difluoro-9,9-diallylfluorene, 2,7-dichloro-9,9-diallylfluorene, 2,7-dibromo-9,9-diallylfluorene, 2,7-diiodo-9,9-diallylfluorene, 2-iodo-7-bromo-9,9-diallylfluorene, 2-(N,N-diphenylamino)-7-bromo-9,9-diallylfluorene, 3,6-di-tert-butyl-9,9-diallylfluorene, 3,6-difluoro-9,9-diallylfluorene, 3,6-dichloro-9,9-diallylfluorene, 3,6-dibromo-9,9-diallylfluorene, 3,6-diiodo-9,9-diallylfluorene, 3-iodo-6-bromo-9,9-diallylfluorene, 3-(N,N-diphenylamino)-6-bromo-9,9-diallylfluorene, 9,9-diallyl-10,10-dimethyl-9,10-dihydroanthracene, 9-allyl-9-((2E)-2-butenyl)-fluorene, 9-allyl-9-((2E)-2-pentenyl)-fluorene, 9-allyl-9-((2E)-2-hexenyl)-fluorene, 9-allyl-9-((2E)-2-octenyl)-fluorene, 9-allyl-9-((2E)-2-nonenyl)-fluorene, 9-allyl-9-((2E)-2-decyl)-fluorene, 9-allyl-9-((2E)-2-undecyl)-fluorene, 9-allyl-9-((2E)-2-dodecyl)-fluorene, and 9-allyl-9-((2E)-2-tridecyl)-fluorene.

Examples of the polymer of the present invention are homopolymers obtained by homopolymerizing each of the above-mentioned compounds. Representative examples of the homopolymer are poly-9,9-diallylfluorene and poly-9-allyl-9-((2E)-2-butenyl)-fluorene.

The polymer of the present invention can be prepared by polymerizing the compound represented by the formula (3). The polymerization is preferably carried out in the presence of a polymerization catalyst formed by contacting a transition metal compound with an organoaluminum compound and/or boron compound.

The transition metal compound is not particularly limited as long as it has an addition polymerization activity, and may be a compound known in the art. Among them, preferred is a transition metal compound having a transition metal of Groups 4 to 10 or lanthanide series in the Periodic Table of the elements. Examples of the transition metal compound are those represented by the following formula (4), and a μ-oxo transition metal compound, which is a dimmer obtained by reacting the transition metal compound with water:

wherein $M^1$ is a transition metal atom of Groups 4 to 10 or lanthanide series of the Periodic Table of the elements (IUPAC 1985); L is a cyclopentadiene-containing anionic group or a hetero atom-having group, and when plural Ls exist, they may be linked with one another directly or through a group having a carbon atom, a silicon atom, a nitrogen atom, an oxygen atom, a sulfur atom or a phosphor atom; $X^1$ is a halogen atom or a hydrocarbyl group having 1 to 20 carbon atoms; a is a number satisfying 0<a≦8; and b is a number satisfying 0<a≦8.

Examples of $M^1$ are a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom, and an ytterbium atom.

Examples of the above-mentioned cyclopentadiene-containing anionic group of L are a cyclopentadienyl group, a substituent-having cyclopentadienyl group, an indenyl group, a substituent-having indenyl group, a fluorenyl group, and a substituent-having fluorenyl group.

Specific examples of the cyclopentadiene-containing anionic group are an $\eta^5$-cyclopentadienyl group, an $\eta^5$-methylcyclopentadienyl group, an $\eta^5$-tert-butylcyclopentadienyl group, an $\eta^5$-1,2-dimethylcyclopentadienyl group, an $\eta^5$-1,3-dimethylcyclopentadienyl group, an $\eta^5$-1-tert-butyl-2-methylcyclopentadienyl group, an $\eta^5$-1-tert-butyl-3-methylcyclopentadienyl group, an $\eta^5$-1-methyl-2-isopropylcyclopentadienyl group, an $\eta^5$-1-methyl-3-isopropylcyclopentadienyl group, an $\eta^5$-1,2,3-trimethylcyclopentadienyl group, an $\eta^5$-1,2,4-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7-tetrahydroindenyl group, an $\eta^5$-2-methylindenyl group, an $\eta^5$-3-methylindenyl group, an $\eta^5$-4-methylindenyl group, an $\eta^5$-5-methylindenyl group, an $\eta^5$-6-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-5-tert-butylindenyl group, an $\eta^5$-6-tert-butylindenyl group, an $\eta^5$-7-tert-butylindenyl group, an $\eta^5$-2,3-dimethylindenyl group, an $\eta^5$-4,7-dimethylindenyl group, an $\eta^5$-2,4,7-trimethylindenyl group, an $\eta^5$-2-methyl-4-isopropylindenyl group, an $\eta^5$-4,5-benzindenyl group, an $\eta^5$-2-methyl-4,5-benzindenyl group, an $\eta^5$-4-phenylindenyl group, an $\eta^5$-2-methyl-5-phenylindenyl group, an $\eta^5$-2-methyl-4-phenylindenyl group, an $\eta^5$-2-methyl-4-naphthylindenyl group, an $\eta^5$-fluorenyl group, an $\eta^5$-2,7-dimethylfluorenyl group, and an $\eta^5$-2,7-di-tert-butylfluorenyl group.

Examples of the hetero atom in the above-mentioned hetero atom-having group of L are an oxygen atom, a sulfur atom, a nitrogen atom, and a phosphorus atom. Examples of the hetero atom-having group are an alkoxy group; an aryloxy group; a thioalkoxy group; a thioaryloxy group; an alkylamino group; an arylamino group; an alkylphosphino group; an arylphosphino group; an aromatic or aliphatic heterocyclic group containing in its ring at least one atom selected from the group consisting of an oxygen atom, a sulfur atom, a nitrogen atom and a phosphorus atom; and a chelating ligand.

Examples of the hetero atom-having group are an alkoxy group such as a methoxy group, an ethoxy group, a propoxy group, and a butoxy group; an aryloxy group such as a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, and a 2,6-di-tert-butylphenoxy group; a substituent-having aryloxy group such as a 4-methoxyphenoxy group, a 2,6-dimethoxyphenoxy group, a 3,5-dimethoxyphenoxy group, a 2-chlorophenoxy group, a 4-nitrosophenoxy group, a 4-nitrophenoxy group, a 2-aminophenoxy group, a 3-aminophenoxy group, a 4-aminothiophenoxy group, a 2,3,6-trichlorophenoxy group, and a 2,4,6-trifluorophenoxy group; a thioalkoxy group such as a thiomethoxy group; an alkylamino group such as a dimethylamino group, a diethylamino group, a dipropylamino group, an isopropylamino group, and a tert-butylamino group; an arylamino group such as a diphenylamino group; a pyrrolyl group; a phosphino group such as a dimethylphosphino group; and a aryldioxy group such as a 2-(2-oxy-1-propyl)phenoxy group, a catecholato group, a resorcinolate group, a 4-isopropylcatecholato group, a 3-methoxycatecholato group, a 1,8-dihydroxynaphthyl group, a 1,2-dihydroxynaphthyl group, a 2,2'-biphenyldiol group, a 1,1'-bi-2-naphthol group, a 2,2'-dihydroxy-6,6'-dimethylbiphenyl group, a 4,4',6,6'-tetra-tert-butyl-2,2'-methylenediphenoxy group, and a 4,4',6,6'-tetramethyl-2,2'-isobutylidenediphenoxy group.

The above-mentioned chelating ligand in the examples of the hetero atom-having group means a ligand having plural coordinating positions. Examples thereof are acetylacetonate, diimine, oxazoline, bisoxazoline, terpyridine, acylhydrazone, diethylenetriamine, triethylenetetramine, porphyrin, crown ether and cryptate.

As mentioned above, when plural Ls exist, they may be linked (namely, plural cyclopentadiene-containing anionic groups may be linked; plural hetero atom-having groups may be linked; or the cyclopentadiene-containing anionic group and the hetero atom-having group may be linked) with one another directly or through a group having a carbon atom, a silicon atom, a nitrogen atom, an oxygen atom, a sulfur atom or a phosphor atom. Examples of the group having a carbon atom, a silicon atom, a nitrogen atom, an oxygen atom, a sulfur atom or a phosphor atom are an alkylene group such as an ethylene group and a propylene group; a substituent-having alkylene group such as a dimethylmethylene group (an isopropylidene group) and a diphenylmethylene group; a silylene group; a substituent-having silylene group such as a dimethylsilylene group, a diphenylsilylene group, and a tetramethyldisilylene group; and a hetero-atom such as a nitrogen atom, an oxygen atom, a sulfur atom and a phosphorus atom.

Examples of the halogen atom of $X^1$ in formula (4) are a fluorine atom, a chlorine atom, a bromine atom and an iodine atom, and examples of the hydrocarbyl group having 1 to 20 carbon atoms of $X^1$ therein are a methyl group, an ethyl group, a n-propyl group, an isopropyl group, a n-butyl group, a phenyl group, and a benzyl group.

Each number of "a" and "b" in formula (4) is determined so that the charge of the transition metal compound represented by formula (4) is neutral, taking account of each valence of $M^1$, L and $X^1$.

Examples of the transition metal compound represented by formula (4), wherein $M^1$ is a titanium atom, are bis(cyclopentadienyl)titanium dichloride, bis(methylcyclopentadienyl)titanium dichloride, bis(n-butylcyclopentadienyl)titanium dichloride, bis(dimethylcyclopentadienyl)titanium dichloride, bis(ethylmethylcyclopentadienyl)titanium dichloride, bis(trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl)titanium dichloride, bis(fluorenyl)titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl(indenyl)titanium dichloride, pentamethylcyclopentadienyl(fluorenyl) titanium dichloride, ethylenebis(cyclopentadienyl)titanium dichloride, ethylenebis(2-methylcyclopentadienyl)titanium dichloride, ethylenebis(3-methylcyclopentadienyl)titanium dichloride, ethylenebis(2-n-butylcyclopentadienyl)titanium dichloride, ethylenebis(3-n-butylcyclopentadienyl)titanium dichloride, ethylenebis(2,3-dimethylcyclopentadienyl)titanium dichloride, ethylenebis(2,4-dimethylcyclopentadienyl)titanium dichloride, ethylenebis(2,5-dimethylcyclopentadienyl)titanium dichloride, ethylenebis(3,4-dimethylcyclopentadienyl)titanium dichloride, ethylenebis(2-ethyl-3-methylcyclopentadienyl)titanium dichloride, ethylenebis(2-ethyl-4-methylcyclopentadienyl)titanium dichloride, ethylenebis(2-ethyl-5-methylcyclopentadienyl)titanium dichloride, ethylenebis(3-ethyl-5-methylcyclopentadienyl)titanium dichloride, ethylenebis(2,3,4-trimethylcyclopentadienyl)titanium dichloride, ethylenebis(2,3,5-trimethylcyclopentadienyl)titanium dichloride, ethylenebis(tetramethylcyclopentadienyl)titanium dichloride, ethylenebis(indenyl)titanium dichloride, ethylenebis(4,5,6,7-tetrahydroindenyl)titanium dichloride, ethylenebis(2-phenylindenyl)titanium dichloride, ethylenebis(2-methylindenyl)titanium dichloride, ethylenebis(2-methyl-4-phenylindenyl)titanium dichloride, ethylenebis(2-methyl-4-naphthylindenyl)titanium dichloride, ethylenebis(2-methyl-4,5-benzoindenyl)titanium dichloride, ethylenebis(fluorenyl)titanium dichloride, ethylene(cyclopentadienyl)(pentamethylcyclopentadienyl)titanium dichloride, ethylene(cyclopentadienyl)(indenyl)titanium dichloride, ethylene(methylcyclopentadienyl) (indenyl)titanium dichloride, ethylene(n-butylcyclopentadienyl)(indenyl)titanium dichloride, ethylene(tetramethylcyclopentadienyl) (indenyl)titanium dichloride, ethylene(cyclopentadienyl)(fluorenyl)titanium dichloride, ethylene(methylcyclopentadienyl) (fluorenyl)titanium dichloride, ethylene (pentamethylcyclopentadienyl)(fluorenyl)titanium dichloride, ethylene(n-butylcyclopentadienyl) (fluorenyl)titanium dichloride, ethylene (tetramethylpentadienyl)(fluorenyl)titanium dichloride, ethylene(indenyl)(fluorenyl)titanium dichloride, isopropylidenebis(cyclopentadienyl)titanium dichloride, isopropylidenebis(2-methylcyclopentadienyl)titanium dichloride, isopropylidenebis(3-methylcyclopentadienyl)titanium dichloride, isopropylidenebis(2-n-butylcyclopentadienyl)titanium dichloride, isopropylidenebis(3-n-butylcyclopentadienyl)titanium dichloride, isopropylidenebis(2,3-dimethylcyclopentadienyl)titanium dichloride, isopropylidenebis(2,4-dimethylcyclopentadienyl)titanium dichloride, isopropylidenebis(2,5-dimethylcyclopentadienyl)titanium dichloride, isopropylidenebis(3,4-dimethylcyclopentadienyl)titanium dichloride, isopropylidenebis(2-ethyl-3-methylcyclopentadienyl)titanium dichloride, isopropylidenebis(2-ethyl-4-methylcyclopentadienyl)titanium dichloride, isopropylidenebis(2-ethyl-5-methylcyclopentadienyl)titanium dichloride, isopropylidenebis(3-ethyl-5-methylcyclopentadienyl)titanium dichloride, isopropylidenebis(2,3,4-trimethylcyclopentadienyl)titanium dichloride, isopropylidenebis(2,3,5-trimethylcyclopentadienyl)titanium dichloride, isopropylidenebis(tetramethylcyclopentadienyl)titanium dichloride, isopropylidenebis(indenyl)titanium dichloride, isopropylidenebis(4,5,6,7-tetrahydroindenyl)titanium dichloride, isopropylidenebis(2-phenylindenyl)titanium dichloride, isopropylidenebis(2-methylindenyl)titanium dichloride, isopropylidenebis(2-methyl-4-phenylindenyl)titanium dichloride, isopropylidenebis(2-methyl-4-naphthylindenyl)titanium dichloride, isopropylidenebis(2-methyl-4,5-benzoindenyl)titanium dichloride, isopropylidenebis(fluorenyl)titanium dichloride, isopropylidene(cyclopentadienyl) (tetramethylcyclopentadienyl)titanium dichloride, isopropylidene(cyclopentadienyl)(indenyl)titanium dichloride, isopropylidene(methylcyclopentadienyl) (indenyl)titanium dichloride, isopropylidene(n-butylcyclopentadienyl) (indenyl)titanium dichloride, isopropylidene(tetramethylcyclopentadienyl) (indenyl)titanium dichloride, isopropylidene (cyclopentadienyl)(fluorenyl)titanium dichloride, isopropylidene(methylcyclopentadienyl)(fluorenyl)titanium dichloride, isopropylidene(n-butylcyclopentadienyl)(fluorenyl)titanium dichloride, isopropylidene(tetramethylcyclopentadienyl) (fluorenyl)titanium dichloride, isopropylidene (indenyl)(fluorenyl)titanium dichloride, dimethylsilylenebis(cyclopentadienyl)titanium dichloride, dimethylsilylenebis(2-methylcyclopentadienyl)titanium dichloride, dimethylsilylenebis(3-methylcyclopentadienyl)titanium dichloride, dimethylsilylenebis(2-n-butylcyclopentadienyl)titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2-ethyl-3-methylcyclopentadienyl)titanium dichloride, dimethylsilylenebis(2-ethyl-4-methylcyclopentadienyl)titanium dichloride, dimethylsilylenebis(2-ethyl-5-methylcyclopentadienyl)titanium dichloride, dimethylsilylenebis(3-ethyl-5-methylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(4,5,6,7-tetrahydroindenyl)titanium dichloride, dimethylsilylenebis(2-phenylindenyl)titanium dichloride, dimethylsilylenebis(2-methylindenyl)titanium dichloride, dimethylsilylenebis(2-methyl-4-phenylindenyl)titanium dichloride, dimethylsilylenebis(2-methyl-4-naphthylindenyl)titanium dichloride, dimethylsilylenebis(2-methyl-4,5-benzoindenyl)titanium dichloride, dimethylsilylene(cyclopentadienyl)(indenyl)titanium dichloride, dimethylsilylene (methylcyclopentadienyl) (indenyl)titanium dichloride, dimethylsilylene(n-butylcyclopentadienyl)(indenyl)titanium dichloride, dimethylsilylene(tetramethylcyclopentadienyl) (indenyl)titanium dichloride, dimethylsilylene(cyclopentadienyl)(fluorenyl)titanium dichloride, dimethylsilylene(methylcyclopentadienyl)(fluorenyl)titanium dichloride, dimethylsilylene(n-butylcyclopentadienyl)(fluorenyl)titanium dichloride, dimethylsilylene(tetramethylcyclopentadienyl) (indenyl)titanium dichloride, dimethylsilylene(indenyl) (fluorenyl)titanium dichloride, cyclopentadienyltitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl (2,6-di-tert-butylphenyl)titanium dichloride, indenyl(2,6-diisopropylphenyl)titanium dichloride, fluorenyl (2,6-diisopropylphenyl)titanium dichloride, methylene (cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy) titanium dichloride, methylene(methylcyclopentadienyl)(3-tert-butyl-5-methyl-2-phenoxy)titanium dichloride, methylene(methylcyclopentadienyl)(3-phenyl-2-phenoxy) titanium dichloride, methylene(methylcyclopentadienyl)(3-tert-butyldimethylsilyl-5-methyl-2-phenoxy)titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene(methylcyclopentadienyl)(3-tert-butyl-5-chloro-2-phenoxy) titanium dichloride, methylene(tetr-butylcyclopentadienyl)(3,5-dimethyl-2-phenoxy)titanium dichloride, methylene(tetr-butylcyclopentadienyl)(3-tert-butyl-2-phenoxy) titanium dichloride, methylene(tetr-butylcyclopentadienyl)(3-tert-butyl-5-methyl-2-phenoxy)titanium dichloride, methylene(tetr-butylcyclopentadienyl)(3-phenyl-2-phenoxy)titanium dichloride, methylene(tetr-butylcyclopentadienyl)(3-tert-butyldimethylsilyl-5-methyl-2-phenoxy)titanium dichloride, methylene(tetr-butylcyclopentadienyl)(3-trimethylsilyl-5-methyl-2-phenoxy)titanium dichloride, methylene(tetr-butylcyclopentadienyl)(3-tert-butyl-5-methoxy-2-phenoxy)titanium dichloride, methylene(tetr-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene(tetramethylcyclopentadienyl)(3-phenyl-2-phenoxy)titanium dichloride, methylene(tetramethylcyclopentadienyl)(3-tert-butyldimethylsilyl-5-methyl-2-phenoxy)titanium dichloride, methylene(tetramethylcyclopentadienyl) (3-trimethylsilyl-5-methyl-2-phenoxy)titanium dichloride, methylene(tetramethylcyclopentadienyl) (3-tert-butyl-5-methoxy-2-phenoxy)titanium dichloride, methylene (tetramethylcyclopentadienyl) (3-tert-butyl-5-chloro-2-phenoxy)titanium dichloride, methylene (trimethylsilylcyclopentadienyl) (3,5-dimethyl-2-phenoxy) titanium dichloride, methylene (trimethylsilylcyclopentadienyl) (3-tert-butyl-2-phenoxy) titanium dichloride, methylene (trimethylsilylcyclopentadienyl) (3-tert-butyl-5-methyl-2-phenoxy)titanium dichloride, methylene (trimethylsilylcyclopentadienyl) (3-phenyl-2-phenoxy) titanium dichloride, methylene (trimethylsilylcyclopentadienyl) (3-tert-butyldimethylsilyl-5-methyl-2-phenoxy)titanium dichloride, methylene (trimethylsilylcyclopentadienyl) (3-trimethylsilyl-5-methyl-2-phenoxy)titanium dichloride, methylene (trimethylsilylcyclopentadienyl) (3-tert-butyl-5-methoxy-2-phenoxy)titanium dichloride, methylene (trimethylsilylcyclopentadienyl) (3-tert-butyl-5-chloro-2-phenoxy)titanium dichloride, methylene(fluorenyl) (3,5-dimethyl-2-phenoxy)titanium dichloride, methylene (fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy) titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy) titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy) titanium dichloride, isopropylidene(cyclopentadienyl)(3-tert-butyl-2-phenoxy)titanium dichloride, isopropylidene (cyclopentadienyl)(3-tert-butyl-5-methyl-2-phenoxy) titanium dichloride, isopropylidene(cyclopentadienyl)(3-phenyl-2-phenoxy)titanium dichloride, isopropylidene (cyclopentadienyl)(3-tert-butyldimethylsilyl-5-methyl-2-phenoxy)titanium dichloride, isopropylidene (cyclopentadienyl)(3-trimethylsilyl-5-methyl-2-phenoxy) titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene (methylcyclopentadienyl)(3-tert-butyldimethylsilyl-5-methyl-2-phenoxy)titanium dichloride, isopropylidene (methylcyclopentadienyl)(3-trimethylsilyl-5-methyl-2-phenoxy)titanium dichloride, isopropylidene (methylcyclopentadienyl)(3-tert-butyl-5-methoxy-2-phenoxy)titanium dichloride, isopropylidene (methylcyclopentadienyl)(3-tert-butyl-5-chloro-2-phenoxy) titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene (tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene (tert-butylcyclopentadienyl)(3-tert-butyl-5-chloro-2-phenoxy)titanium dichloride, isopropylidene (tetramethylcyclopentadienyl)(3,5-dimethyl-2-phenoxy) titanium dichloride, isopropylidene (tetramethylcyclopentadienyl)(3-tert-butyl-2-phenoxy) titanium dichloride, isopropylidene (tetramethylcyclopentadienyl)(3-tert-butyl-5-methyl-2-phenoxy)titanium dichloride, isopropylidene (tetramethylcyclopentadienyl)(3-phenyl-2-phenoxy) titanium dichloride, isopropylidene (tetramethylcyclopentadienyl)(3-tert-butyldimethylsilyl-5-methyl-2-phenoxy)titanium dichloride, isopropylidene (tetramethylcyclopentadienyl)(3-trimethylsilyl-5-methyl-2-phenoxy)titanium dichloride, isopropylidene (tetramethylcyclopentadienyl)(3-tert-butyl-5-methoxy-2-phenoxy)titanium dichloride, isopropylidene (tetramethylcyclopentadienyl)(3-tert-butyl-5-chloro-2-phenoxy)titanium dichloride, isopropylidene (trimethylsilylcyclopentadienyl)(3,5-dimethyl-2-phenoxy) titanium dichloride, isopropylidene (trimethylsilylcyclopentadienyl)(3-tert-butyl-2-phenoxy) titanium dichloride, isopropylidene (trimethylsilylcyclopentadienyl)(3-tert-butyl-5-methyl-2-phenoxy)titanium dichloride, isopropylidene (trimethylsilylcyclopentadienyl)(3-phenyl-2-phenoxy) titanium dichloride, isopropylidene (trimethylsilylcyclopentadienyl)(3-tert-butyldimethylsilyl-5-methyl-2-phenoxy)titanium dichloride, isopropylidene (trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert-butyl-5-methoxy-2-phenoxy)titanium dichloride, diphenylmethylene(methylcyclopentadienyl)(3-tert-butyl-5-chloro-2-phenoxy)titanium dichloride, diphenylmethylene(tert-butylcyclopentadienyl)(3,5-dimethyl-2-phenoxy)titanium dichloride, diphenylmethylene(tert-butylcyclopentadienyl)(3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl)(3-tert-butyldimethylsilyl-5-methyl-2-phenoxy)titanium dichloride, diphenylmethylene(tert-butylcyclopentadienyl)(3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert-butyl-2-phenoxy)titanium dichloride, diphenylmethylene(tetramethylcyclopentadienyl)(3-tert-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert-butyl-5-methoxy-2-phenoxy)titanium dichloride, diphenylmethylene(tetramethylcyclopentadienyl)(3-tert-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert-butyl-2-phenoxy)titanium dichloride, diphenylmethylene(trimethylsilylcyclopentadienyl)(3-tert-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene (methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-diamyl-2-phenoxy)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy)titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy)titanium dichloride, dimethylsilylene(tert-butylcyclopentadienyl)(3-tert-butyl-5-chloro-2-phenoxy)titanium dichloride, dimethylsilylene(tert-butylcyclopentadienyl)(3,5-diamyl-2-phenoxy)titanium dichloride, dimethylsilylene(tetramethylcyclopentadienyl)(2-phenoxy)titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl-2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-diamyl-2-phenoxy)titanium dichloride, dimethylsilylene(trimethylsilylcyclopentadienyl)(2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)titanium dichloride, dimethylsilylene(trimethylsilylcyclopentadienyl)(3,5-diamyl-2-phenoxy)titanium dichloride, dimethylsilylene(indenyl)(2-phenoxy)titanium dichloride, dimethylsilylene(indenyl)(3-methyl-2-phenoxy)titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-diamyl-2-phenoxy)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy)titanium dichloride, dimethylsilylene(fluorenyl)(5-methyl-3-phenyl-2-phenoxy)titanium dichloride, dimethylsilylene(fluorenyl)(3-tert-butyldimethylsilyl-5-methyl-2-phenoxy)titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, and dimethylsilylene(tetramethylcyclopentadienyl)(1-naphthoxy-2-yl)titanium dichloride; compounds obtained by replacing the term "(2-phenoxy)" of those compounds with the term "(3-phenyl-2-phenoxy)", "(3-trimethylsilyl-2-phenoxy)" or "(3-tert-butyldimethylsilyl-2-phenoxy)"; compounds obtained by replacing the term "dimethylsilylene" of those compounds with the term "diethylsilylene", "diphenylsilylene" or "dimethoxysilylene"; and compounds obtained by replacing the term "dichloride" of those compounds with the term "difluoride", "dibromide", "diiodide", "dimethyl", "diethyl", "diisopropyl", "bis(dimethylamido)", "bis(diethylamido)", "dimethoxide", "diethoxide", "di-n-butoxide" or "diisopropoxide".

Further examples of the transition metal compound represented by formula (4), wherein $M^1$ is a titanium atom, are (tert-butylamido)tetramethylcyclopentadienyl-1,2-ethanediyltitanium dichloride, (tert-butylamido)tetramethylcyclopentadienyl-1,2-ethanediyltitanium dimethyl, (tert-butylamido)tetramethylcyclopentadienyl-1,2-ethanediyltitanium dibenzyl, (methylamido)tetramethylcyclopentadienyl-1,2-ethanediyltitanium dichloride, (ethylamido)tetramethylcyclopentadienyl-1,2-ethanediyltitanium dichloride, (tert-butylamido)tetramethylcyclopentadienyl dimethylsilanetitanium dichloride, (tert-butylamido)tetramethylcyclopentadienyl dimethylsilanetitanium dimethyl, (tert-butylamido)tetramethylcyclopentadienyl dimethylsilanetitanium dibenzyl, (benzylamido)tetramethylcyclopentadienyl dimethylsilanetitanium dichloride, (phenylphosphido)tetramethylcyclopentadienyl dimethylsilanetitanium dibenzyl, (tert-butylamido)indenyl-1,2-ethanediyltitanium dichloride, (tert-butylamido)indenyl-1,2-ethanediyltitanium dimethyl, (tert-butylamido)tetrahydroindenyl-1,2-ethanediyl titanium dichloride, (tert-butylamido)tetrahydroindenyl-1,2-ethanediyl titanium dimethyl, (tert-butylamido)fluorenyl-1,2-ethanediyltitanium dichloride, (tert-butylamido)fluorenyl-1,2-ethanediyltitanium dimethyl, (tert-butylamido)indenyldimethylsilanetitanium dichloride, (tert-butylamido)indenyldimethylsilanetitanium dimethyl, (tert-butylamido)tetrahydroindenyldimethylsilane titanium dichloride, (tert-butylamido)tetrahydroindenyldimethylsilane titanium dimethyl, (tert-butylamido)fluorenyldimethylsilanetitanium dichloride, (tert-butylamido)fluorenyldimethylsilanetitanium dimethyl, (dimethylaminomethyl)tetramethylcyclopentadienyl titanium(III) dichloride, (dimethylaminoethyl)tetramethylcyclopentadienyl titanium(III) dichloride, (dimethylaminopropyl)tetramethylcyclopentadienyl titanium(III) dichloride, (N-pyrrolidinylethyl)tetramethylcyclopentadienyl titanium dichloride, (B-dimethylaminoborabenzene)cyclopentadienylzirconium dichloride, cyclopentadienyl(9-mesitylboraanthracenyl)zirconium dichloride, 2,2'-thiobis(4-methyl-6-tert-butylphenoxy)titanium dichloride, 2,2'-thiobis[4-methyl-6-(1-methylethyl)phenoxy]titanium dichloride, 2,2'-thiobis[4,6-dimethylphenoxy]titanium dichloride, 2,2'-methylenebis(4-methyl-6-tert-butylphenoxy)titanium dichloride, 2,2'-ethylenebis(4-methyl-6-tert-butylphenoxy)titanium dichloride, 2,2'-sulfinylbis(4-methyl-6-tert-butylphenoxy)titanium dichloride, 2,2'-(4,4',6,6'-tetra-tert-butyl-1,1'-biphenoxy)titanium dichloride, 2,2'-thiobis[4-methyl-6-tert-butylphenoxy]titanium diisopropoxide, 2,2'-methylenebis(4-methyl-6-tert-butylphenoxy)titanium diisopropoxide, 2,2'-ethylenebis(4-methyl-6-tert-butylphenoxy)titanium diisopropoxide, 2,2'-sulfinylbis(4-methyl-6-tert-butylphenoxy)titanium diisopropoxide, (di-tert-butyl-1,3-propanediamido)titanium dichloride, (dicyclohexyl-1,3-propanediamido)titanium dichloride, [bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido]titanium dichloride, [bis(2,6-diisopropylphenyl)-1,3-propanediamido]titanium dichloride, [bis(2,6-di-tert-butylphenyl)-1,3-propanediamido]titanium dichloride, [bis(triisopropylsilyl)naphthalenediamido]titanium dichloride, [bis(trimethylsilyl)naphthalenediamido]titanium dichloride, [bis(tert-butyldimethylsilyl)naphthalenediamido]titanium dichloride, [bis(tert-butyldimethylsilyl)naphthalenediamido]titanium dibromide, [hydrotris(3,5-dimethylpyrazolyl)borate]titanium trichloride, [hydrotris(3,5-dimethylpyrazolyl)borate]titanium tribromide, [hydrotris(3,5-dimethylpyrazolyl)borate]titanium triiodide, [hydrotris(3,5-diethylpyrazolyl)borate]titanium trichloride, [hydrotris(3,5-diethylpyrazolyl)borate]titanium tribromide, [hydrotris(3,5-diethylpyrazolyl)borate]titanium triiodide, [hydrotris(3,5-di-tert-butylpyrazolyl)borate]titanium trichloride, [hydrotris(3,5-di-tert-butylpyrazolyl)borate]titanium tribromide, [hydrotris(3,5-di-tert-butylpyrazolyl)borate]titanium triiodide, [tris(3,5-dimethylpyrazolyl)methyl]titanium trichloride, [tris(3,5-dimethylpyrazolyl)methyl]titanium tribromide, [tris(3,5-dimethylpyrazolyl)methyl]titanium triiodide, [tris(3,5-diethylpyrazolyl)methyl]titanium trichloride, [tris(3,5-diethylpyrazolyl)methyl]titanium tribromide, [tris(3,5-diethylpyrazolyl)methyl]titanium triiodide, [tris(3,5-di-tert-butylpyrazolyl)methyl]titanium trichloride, [tris(3,5-di-tert-butylpyrazolyl)methyl]titanium tribromide, [tris(3,5-di-tert-butylpyrazolyl)methyl]titanium triiodide, μ-oxobis[isopropylidene(cyclopentadienyl)(2-phenoxy) titanium chloride], μ-oxobis[isopropylidene (cyclopentadienyl)(2-phenoxy)titanium methoxide], μ-oxobis[isopropylidene(cyclopentadienyl)(3-tert-butyl-5-methyl-2-phenoxy)titanium chloride], μ-oxobis [isopropylidene(cyclopentadienyl)(3-tert-butyl-5-methyl-2-phenoxy)titanium methoxide], μ-oxobis[isopropylidene (methylcyclopentadienyl)(2-phenoxy)titanium chloride], μ-oxobis[isopropylidene (methylcyclopentadienyl)(2-phenoxy)titanium methoxide], μ-oxobis[isopropylidene (methylcyclopentadienyl)(3-tert-butyl-5-methyl-2-phenoxy)titanium chloride], μ-oxobis[isopropylidene (methylcyclopentadienyl)(3-tert-butyl-5-methyl-2-phenoxy)titanium methoxide], μ-oxobis [isopropylidene (tetramethylcyclopentadienyl)(2-phenoxy) titanium chloride], μ-oxobis[isopropylidene (tetramethylcyclopentadienyl) (2-phenoxy)titanium methoxide], μ-oxobis[isopropylidene (tetramethylcyclopentadienyl)(3-tert-butyl-5-methyl-2-phenoxy)titanium chloride], μ-oxobis[isopropylidene (tetramethylcyclopentadienyl)(3-tert-butyl-5-methyl-2-phenoxy)titanium methoxide], μ-oxobis[dimethylsilylene (cyclopentadienyl)(2-phenoxy)titanium chloride], μ-oxobis[dimethylsilylene (cyclopentadienyl)(2-phenoxy) titanium methoxide], μ-oxobis[dimethylsilylene (cyclopentadienyl)(3-tert-butyl-5-methyl-2-phenoxy)titanium chloride], μ-oxobis [dimethylsilylene(cyclopentadienyl) (3-tert-butyl-5-methyl-2-phenoxy)titanium methoxide], μ-oxobis[dimethylsilylene (methylcyclopentadienyl)(2-phenoxy)titanium chloride], μ-oxobis[dimethylsilylene (methylcyclopentadienyl)(2-phenoxy)titanium methoxide], μ-oxobis[dimethylsilylene(methylcyclopentadienyl) (3-tert-butyl-5-methyl-2-phenoxy)titanium chloride], μ-oxobis[dimethylsilylene (methylcyclopentadienyl) (3-tert-butyl-5-methyl-2-phenoxy)titanium methoxide], μ-oxobis[dimethylsilylene (tetramethylcyclopentadienyl) (2-phenoxy)titanium chloride], μ-oxobis[dimethylsilylene (tetramethylcyclopentadienyl)(2-phenoxy)titanium methoxide], μ-oxobis[dimethylsilylene(tetramethylcyclopentadienyl) (3-tert-butyl-5-methyl-2-phenoxy)titanium chloride], μ-oxobis [dimethylsilylene(tetramethylcyclopentadienyl) (3-tert-butyl-5-methyl-2-phenoxy)titanium methoxide], di-μ-oxobis [isopropylidene(cyclopentadienyl)(2-phenoxy)titanium], di-μ-oxobis[isopropylidene(cyclopentadienyl) (3-tert-butyl-5-methyl-2-phenoxy)titanium], di-μ-oxobis[isopropylidene (methylcyclopentadienyl)(2-phenoxy)titanium], di-μ-oxobis [isopropylidene(methylcyclopentadienyl)(3-tert-butyl-5- methyl-2-phenoxy)titanium], di-μ-oxobis[isopropylidene (tetramethylcyclopentadienyl)(2-phenoxy)titanium], di-μ-oxobis[isopropylidene (tetramethylcyclopentadienyl)(3-tert-butyl-5-methyl-2-phenoxy)titanium], di-μ-oxobis[dimethylsilylene (cyclopentadienyl)(2-phenoxy)titanium], di-μ-oxobis[dimethylsilylene(cyclopentadienyl)(3-tert-butyl-5-methyl-2-phenoxy)titanium], di-μ-oxobis[dimethylsilylene (methylcyclopentadienyl)(2-phenoxy)titanium], di-μ-oxobis[dimethylsilylene(methylcyclopentadienyl)(3-tert-butyl-5-methyl-2-phenoxy)titanium], di-μ-oxobis [dimethylsilylene (tetramethylcyclopentadienyl)(2-phenoxy)titanium], and di-μ-oxobis[dimethylsilylene (tetramethylcyclopentadienyl) (3-tert-butyl-5-methyl-2-phenoxy)titanium].

Examples of the transition metal compound represented by formula (4), wherein $M^1$ is a zirconium atom or a hafnium atom, are compounds obtained by replacing the term "titanium" of the above-exemplified titanium compounds with the term "zirconium" or "hafnium".

Examples of the transition metal compound represented by formula (4), wherein $M^1$ is a vanadium atom, are vanadium acetylacetonate, vanadium tetrachloride and vanadium oxy trichloride.

An example of the transition metal compound represented by formula (4), wherein $M^1$ is a samarium atom, is bis(pentamethylcyclopentadienyl)samarium methyltetrahydrofuran.

An example of the transition metal compound represented by formula (4), wherein $M^1$ is an ytterbium atom, is bis (pentamethylcyclopentadienyl)ytterbium methyltetrahydrofuran.

Examples of the transition metal compound represented by formula (4), wherein $M^1$ is a palladium atom, are 2,2'-methylenebis[(4R)-4-phenyl-5,5'-dimethyloxazoline]palladium dichloride, 2,2'-methylenebis[(4R)-4-phenyl-5,5'-dimethyloxazoline]palladium dibromide, 2,2'-methylenebis [(4R)-4-phenyl-5,5'-diethyloxazoline]palladium dichloride, 2,2'-methylenebis[(4R)-4-phenyl-5,5'-diethyloxazoline]palladium dibromide, 2,2'-methylenebis[(4R)-4-phenyl-5,5'-di-n-propyloxazoline]palladium dichloride, 2,2'-methylenebis[(4R)-4-phenyl-5,5'-di-n-propyloxazoline]palladium dibromide, 2,2'-methylenebis[(4R)-4-phenyl-5,5'-diisopropyloxazoline]palladium dichloride, 2,2'-methylenebis[(4R)-4-phenyl-5,5'-diisopropyloxazoline]palladium dibromide, 2,2'-methylenebis[(4R)-4-phenyl-5,5'-dicyclohexyloxazoline]palladium dichloride, 2,2'-methylenebis[(4R)-4-phenyl-5,5'-dicyclohexyloxazoline]palladium dibromide, 2,2'-methylenebis[(4R)-4-phenyl-5,5'-dimethoxyoxazoline]palladium dichloride, 2,2'-methylenebis [(4R)-4-phenyl-5,5'-dimethoxyoxazoline]palladium dibromide, 2,2'-methylenebis[(4R)-4-phenyl-5,5'-diethoxyoxazoline]palladium dichloride, 2,2'-methylenebis[(4R)-4-phenyl-5,5'-diethoxyoxazoline]palladium dibromide, 2,2'-methylenebis [(4R)-4-phenyl-5,5'-diphenyloxazoline]palladium dichloride, 2,2'-methylenebis[(4R)-4-phenyl-5,5'-diphenyloxazoline]palladium dibromide, methylenebis[(4R)-4-methyl-5,5'-di-(2-methylphenyl)oxazoline]palladium dibromide, methylenebis[(4R)-4-methyl-5,5'-di-(3-methylphenyl) oxazoline]palladium dibromide, methylenebis[(4R)-4-methyl-5,5'-di-(4-methylphenyl)oxazoline]palladium dibromide, methylenebis[(4R)-4-methyl-5,5'-di-(2-methoxyphenyl) oxazoline]palladium dibromide, methylenebis[(4R)-4-methyl-5,5'-di-(3-methoxyphenyl)oxazoline]palladium dibromide, methylenebis[(4R)-4-methyl-5,5'-di-(4-methoxyphenyl) oxazoline]palladium dibromide, methylenebis [spiro{(4R)-4-methyloxazoline-5,1'-cyclobutane}]palladium dibromide, methylenebis[spiro{(4R)-4-methyloxazoline-5,1'-cyclopentane}]palladium dibromide, methylenebis[spiro{(4R)-4-methyloxazoline-5,1'-cyclohexane}]palladium dibromide, methylenebis[spiro{(4R)-4-methyloxazoline-5,1'-cycloheptane}]palladium dibromide, 2,2'-methylenebis[(4R)-4-isopropyl-5,5'-dimethyloxazoline]palladium dibromide, 2,2'-methylenebis[(4R)-4-isopropyl-5,5'-diethyloxazoline]palladium dibromide, 2,2'-methylenebis [(4R)-4-isopropyl-5,5'-di-n-propyloxazoline]palladium dibromide, methylenebis[(4R)-4-isopropyl-5,5'-diisopropyloxazoline]palladium dibromide, 2,2'-methylenebis [(4R)-4-isopropyl-5,5'-dicyclohexyloxazoline]palladium dibromide, 2,2'-methylenebis[(4R)-4-isopropyl-5,5'-diphenyloxazoline]palladium dibromide, 2,2'-methylenebis [(4R)-4-isopropyl-5,5'-di-(2-methylphenyl)oxazoline]palladium dibromide, 2,2'-methylenebis[(4R)-4-isopropyl-5,5'-di-(3-methylphenyl)oxazoline]palladium dibromide, 2,2'-methylenebis [(4R)-4-isopropyl-5,5'-di-(4-methylphenyl) oxazoline]palladium dibromide, 2,2'-methylenebis[(4R)-4-isopropyl-5,5'-di-(2-methoxyphenyl)oxazoline]palladium dibromide, 2,2'-methylenebis[(4R)-4-isopropyl-5,5'-di-(3-methoxyphenyl) oxazoline]palladium dibromide, 2,2'-methylenebis[(4R)-4-isopropyl-5,5'-di-(4-methoxyphenyl)oxazoline]palladium dibromide, 2,2'-methylenebis [spiro{(4R)-4-isopropyloxazoline-5,1'-cyclobutane}]palladium dibromide, 2,2'-methylenebis[spiro{(4R)-4-isopropyloxazoline-5,1'-cyclopentane}]palladium dibromide, 2,2'-methylenebis[spiro{(4R)-4-isopropyloxazoline-5,1'-cyclohexane}]palladium dibromide, 2,2'-methylenebis [spiro{(4R)-4-isopropyloxazoline-5,1'-cycloheptane}]palladium dibromide, 2,2'-methylenebis[(4R)-4-isobutyl-5,5'-dimethyloxazoline]palladium dibromide, 2,2'-methylenebis [(4R)-4-isobutyl-5,5'-diethyloxazoline]palladium dibromide, 2,2'-methylenebis[(4R)-4-isobutyl-5,5'-di-n-propyloxazoline]palladium dibromide, 2,2'-methylenebis[(4R)-4-isobutyl-5,5'-diisopropyloxazoline]palladium dibromide, 2,2'-methylenebis[(4R)-4-isobutyl-5,5'-dicyclohexyloxazoline]palladium dibromide, 2,2'-methylenebis[(4R)-4-isobutyl-5,5'-diphenyloxazoline] palladium dibromide, 2,2'-methylenebis [(4R)-4-isobutyl-5,5'-di-(2-methylphenyl)oxazoline]palladium dibromide, 2,2'-methylenebis[(4R)-4-isobutyl-5,5'-di-(3-methylphenyl) oxazoline]palladium dibromide, 2,2'-methylenebis[(4R)-4-isobutyl-5,5'-di-(4-methylphenyl) oxazoline]palladium dibromide, 2,2'-methylenebis[(4R)-4-isobutyl-5,5"-di-(2-methoxyphenyl)oxazoline]palladium dibromide, 2,2'-methylenebis[(4R)-4-isobutyl-5,5'-di-(3-methoxyphenyl)oxazoline]palladium dibromide, 2,2'-methylenebis[(4R)-4-isobutyl-5,5'-di-(4-methoxyphenyl) oxazoline]palladium dibromide, 2,2'-methylenebis[spiro{(4R)-4-isobutyloxazoline-5,1'-cyclobutane}]palladium dibromide, 2,2'-methylenebis[spiro{(4R)-4-isobutyloxazoline-5,1'-cyclopentane}] palladium dibromide, 2,2'-methylenebis [spiro{(4R)-4-isobutyloxazoline-5,1'-cyclohexane}]palladium dibromide, 2,2'-methylenebis[spiro{(4R)-4-isobutyloxazoline-5,1'-cycloheptane}]palladium dibromide, 2,2'-methylenebis[(4R)-4-tert-butyl-5,5'-dimethyloxazoline]palladium dibromide, 2,2'-methylenebis[(4R)-4-tert-butyl-5,5'-diethyloxazoline] palladium dibromide, 2,2'-methylenebis [(4R)-4-tert-butyl-5,5'-di-n-propyloxazoline]palladium dibromide, 2,2'-methylenebis[(4R)-4-tert-butyl-5,5'-diisopropyloxazoline] palladium dibromide, 2,2'-methylenebis [(4R)-4-tert-butyl-5,5'-diphenyloxazoline]palladium dibromide, 2,2'-methylenebis[(4R)-4-tert-butyl-5,5'-dicyclohexyloxazoline] palladium dibromide, 2,2'-methylenebis [(4R)-4-tert-butyl-5,5'-di-(2-methylphenyl)oxazoline]palladium dibromide, 2,2'-methylenebis[(4R)-4-tert-butyl-5,5'-di-(3-methylphenyl)oxazoline]palladium dibromide, 2,2'-methylenebis [(4R)-4-tert-butyl-5,5'-di-(4-methylphenyl)oxazoline]palladium dibromide, 2'-methylenebis[(4R)-4-tert-butyl-5,5'-di-(2-methoxyphenyl)oxazoline]palladium dibromide, 2,2'-methylenebis[(4R)-4-tert-butyl-5,5'-di-(3-methoxyphenyl) oxazoline]palladium dibromide, 2,2'-methylenebis[(4R)-4-tert-butyl-5,5'-di-(4-methoxyphenyl)oxazoline]palladium dibromide, 2,2'-methylenebis[spiro{(4R)-4-tert-butyloxazoline-5,1'-cyclobutane}]palladium dibromide, 2,2'-methylenebis[spiro {(4R)-4-tert-butyloxazoline-5,1'-cyclopentane}]palladium dibromide, 2,2'-methylenebis[spiro{(4R)-4-tert-butyloxazoline-5,1'-cyclohexane}]palladium dibromide, 2,2'-methylenebis[spiro{(4R)-4-tert-butyloxazoline-5,1'-cycloheptane}]palladium dibromide, 2,2'-methylenebis [(4R)-4-phenyl-5,5'-dimethyloxazoline]palladium dibromide, 2,2'-methylenebis[(4R)-4-phenyl-5,5'-diethyloxazoline]palladium dibromide, 2,2'-methylenebis[(4R)-4-phenyl-5,5'-di-n-propyloxazoline]palladium dibromide, 2,2'-methylenebis [(4R)-4-phenyl-5,5'-diisopropyloxazoline] palladium dibromide, 2,2'-methylenebis[(4R)-4-phenyl-5,5'-dicyclohexyloxazoline]palladium dibromide, 2,2'-methylenebis[(4R)-4-phenyl-5,5'-diphenyloxazoline] palladium dibromide, 2,2'-methylenebis[(4R)-4-phenyl-5,5'-di-(2-methylphenyl)oxazoline]palladium dibromide, 2,2'-methylenebis[(4R)-4-phenyl-5,5'-di-(3-methylphenyl) oxazoline]palladium dibromide, 2,2'-methylenebis[(4R)-4-phenyl-5,5'-di-(4-methylphenyl)oxazoline]palladium dibromide, 2,2'-methylenebis[(4R)-4-phenyl-5,5'-di-(2-methoxyphenyl)oxazoline]palladium dibromide, 2,2'-methylenebis [(4R)-4-phenyl-5,5'-di-(3-methoxyphenyl) oxazoline] palladium dibromide, 2,2'-methylenebis[(4R)-4-phenyl-5,5'-di-(4-methoxyphenyl)oxazoline]palladium dibromide, 2,2'-methylenebis[spiro{(4R)-4-phenyloxazoline-5,1'-cyclobutane}]palladium dibromide, 2,2'-methylenebis [spiro{(4R)-4-phenyloxazoline-5,1'-cyclopentane}]palladium dibromide, 2,2'-methylenebis[spiro{(4R)-4-phenyloxazoline-5,1'-cyclohexane}]palladium dibromide, 2,2'-methylenebis[spiro{(4R)-4-phenyloxazoline-5,1'-cycloheptane}] palladium dibromide, 2,2'-methylenebis[(4R)-4-benzyl-5,5'-dimethyloxazoline]palladium dibromide, 2,2'-methylenebis [(4R)-4-benzyl-5,5'-diethyloxazoline]palladium dibromide, 2,2'-methylenebis[(4R)-4-benzyl-5,5'-di-n-propyloxazoline] palladium dibromide, 2,2'-methylenebis [(4R)-4-benzyl-5,5'-diisopropyloxazoline]palladium dibromide, 2,2'-methylenebis[(4R)-4-benzyl-5,5'-dicyclohexyloxazoline]palladium dibromide, 2,2'-methylenebis[(4R)-4-benzyl-5,5'-diphenyloxazoline]palladium dibromide, 2,2'-methylenebis[(4R)-4-benzyl-5,5'-di-(2-methylphenyl)oxazoline]palladium dibromide, 2'-methylenebis[(4R)-4-benzyl-5,5'-di-(3-methylphenyl) oxazoline]palladium dibromide, 2,2'-methylenebis[(4R)-4-benzyl-5,5'-di-(4-methylphenyl) oxazoline]palladium dibromide, 2,2'-methylenebis[(4R)-4-benzyl-5,5'-di-(2-methoxyphenyl)oxazoline]palladium dibromide, 2,2'-methylenebis[(4R)-4-benzyl-5,5'-di-(3-methoxyphenyl) oxazoline]palladium dibromide, 2,2'-methylenebis[(4R)-4-benzyl-5,5'-di-(4-methoxyphenyl)oxazoline]palladium dibromide, 2,2'-methylenebis[spiro{(4R)-4-benzyloxazoline-5,1'-cyclobutane}]palladium dibromide, 2,2'-methylenebis[spiro{(4R)-4-benzyloxazoline-5,1'-cyclopentane}]palladium dibromide, 2,2'-methylenebis [spiro{(4R)-4-benzyloxazoline-5,1'-cyclohexane}]palladium dibromide, and 2,2'-methylenebis[spiro{(4R)-4-benzyloxazoline-5,1'-cycloheptane}]palladium dibromide; compounds obtained by replacing the term "(4R)" of the above-exemplified compounds with the term "(4S)"; and antipodes and diastreomers of the above-exemplified compounds.

Further examples of the transition metal compound represented by formula (4), wherein $M^1$ is a palladium atom, are [hydrotris(3,5-dimethylpyrazolyl)borate]palladium chloride, [hydrotris(3,5-dimethylpyrazolyl)borate]palladium bromide, [hydrotris(3,5-dimethylpyrazolyl)borate]palladium iodide, [hydrotris(3,5-dimethylpyrazolyl)borate]palladium methyl, [hydrotris(3,5-dimethylpyrazolyl)borate]palladium ethyl, [hydrotris(3,5-dimethylpyrazolyl)borate] palladium allyl, [hydrotris(3,5-dimethylpyrazolyl)borate] palladium methallyl, [hydrotris(3,5-diethylpyrazolyl)borate] palladium chloride, [hydrotris(3,5-diethylpyrazolyl)borate] palladium bromide, [hydrotris(3,5-diethylpyrazolyl)borate] palladium iodide, [hydrotris(3,5-diethylpyrazolyl)borate] palladium methyl, [hydrotris(3,5-diethylpyrazolyl)borate] palladium ethyl, [hydrotris(3,5-diethylpyrazolyl)borate] palladium allyl, [hydrotris(3,5-diethylpyrazolyl)borate] palladium methallyl, [hydrotris(3,5-di-tert-butylpyrazolyl) borate]palladium chloride, [hydrotris(3,5-di-tert-butylpyrazolyl)borate]palladium bromide, [hydrotris(3,5-di-tert-butylpyrazolyl)borate]palladium iodide, [hydrotris(3,5-di-tert-butylpyrazolyl)borate]palladium methyl, [hydrotris (3,5-di-tert-butylpyrazolyl)borate]palladium ethyl, [hydrotris(3,5-di-tert-butylpyrazolyl) borate]palladium allyl, [hydrotris(3,5-di-tert-butylpyrazolyl)borate]palladium methallyl, chloro(methyl)[N,N'-(ethane-1,2-diylidene)bis (aniline-κN)]palladium, chloro(methyl)[N,N'-(ethane-1,2-diylidene)bis(2-methylaniline-κN)]palladium, chloro(methyl)[N,N'-(ethane-1,2-diylidene)bis(2-ethylaniline-κN)] palladium, chloro(methyl)[N,N'-(ethane-1,2-diylidene)bis (2-n-propylaniline-κN)]palladium, chloro(methyl)[N,N'-(ethane-1,2-diylidene)bis(2-isopropylaniline-κN) ]palladium, chloro(methyl)[N,N'-(ethane-1,2-diylidene)bis (2-n-butylaniline-κN)]palladium, chloro(methyl)[N,N'-(ethane-1,2-diylidene)bis(2-isobutylaniline-κN)]palladium, chloro(methyl)[N,N'-(ethane-1,2-diylidene)bis(2-n-hexylaniline-κN)]palladium, chloro(methyl)[N,N'-(ethane-1,2-diylidene)bis(4-methylaniline-κN)]palladium, chloro(methyl)[N,N'-(ethane-1,2-diylidene)bis(2,6-dimethylaniline-κN)]palladium, chloro(methyl)[N,N'-(ethane-1,2-diylidene) bis(2,6-diethylaniline-κN)]palladium, chloro(methyl)[N,N'-(ethane-1,2-diylidene)bis(2,6-di-n-propylaniline-κN)] palladium, chloro(methyl)[N,N'-(ethane-1,2-diylidene)bis (2,6-diisopropylaniline-κN)]palladium, chloro(methyl)[N, N'-(ethane-1,2-diylidene)bis(2,6-di-n-butylaniline-κN)] palladium, chloro(methyl)[N,N'-(ethane-1,2-diylidene)bis (2,6-diisobutylaniline-κN)]palladium, chloro(methyl)[N,N'-(ethane-1,2-diylidene)bis(2,6-di-n-hexylaniline-κN)] palladium, chloro(methyl)[N,N'-(ethane-1,2-diylidene)bis (2-methyl-6-ethylaniline-κN)]palladium, chloro(methyl)[N, N'-(ethane-1,2-diylidene)bis(2-methyl-6-n-propylaniline-κN)]palladium, chloro(methyl)[N,N'-(ethane-1,2-diylidene) bis(2-methyl-6-isopropylaniline-κN)]palladium, chloro (methyl)[N,N'-(ethane-1,2-diylidene)bis(2-methyl-6-butylaniline-κN)]palladium, chloro(methyl)[N,N'-(ethane-1, 2-diylidene)bis(2-ethyl-6-n-propylaniline-κN)]palladium, chloro(methyl)[N,N'-(ethane-1,2-diylidene)bis(2-ethyl-6-isopropylaniline-κN)]palladium, chloro(methyl)[N,N'-(ethane-1,2-diylidene)bis(2-ethyl-6-n-butylaniline-κN)]palladium, chloro(methyl)[N,N'-(ethane-1,2-diylidene)bis(2-n-propyl-6-isopropylaniline-κN)]palladium, chloro(methyl) [N,N'-(ethane-1,2-diylidene)bis(2-n-propyl-6-n-butylaniline-κN)]palladium, chloro(methyl)[N,N'-(ethane-1, 2-diylidene)bis(2-isopropyl-6-n-butylaniline-κN)] palladium, chloro(methyl)[N,N'-(ethane-1,2-diylidene)bis (2,4,6-trimethylaniline-κN)]palladium, chloro(methyl)[N, N'-(ethane-1,2-diylidene)bis{2,4-dimethyl-6-(2-methylphenyl) aniline-κN}]palladium, chloro(methyl)[N, N'-(ethane-1,2-diylidene)bis{-2,4-dimethyl-6-(2-ethylphenyl)aniline-κN}]palladium, chloro(methyl)[N,N'-(ethane-1,2-diylidene)bis{2,4-dimethyl-6-(2-n- propylphenyl)aniline-κN}]palladium, chloro(methyl)[N,N'-(ethane-1,2-diylidene)bis{-2,4-dimethyl-6-(2-isopropylphenyl)aniline-κN}]palladium, chloro(methyl)[N,N'-(ethane-1,2-diylidene)bis{2,4-dimethyl-6-(2,6-dimethylphenyl)aniline-κN}]palladium, chloro(methyl)[N,N'-(ethane-1,2-diylidene)bis{2,4-dimethyl-6-(2,6-diethylphenyl)aniline-κN}]palladium, chloro(methyl)[N,N'-(ethane-1,2-diylidene)bis{2,4-dimethyl-6-(2,6-di-n-propylphenyl)aniline-κN}]palladium, chloro(methyl)[N,N'-(ethane-1,2-diylidene)bis{2,4-dimethyl-6-(2,6-diisopropylphenyl)aniline-κN}]palladium, chloro(methyl)[N,N'-(ethane-1,2-diylidene)bis{2,4-dimethyl-6-(2-methyl-6-ethylphenyl)aniline-κN}]palladium, chloro(methyl)[N,N'-(ethane-1,2-diylidene)bis{2,4-dimethyl-6-(2-methyl-6-n-propylphenyl)aniline-κN}]palladium, chloro(methyl)[N,N'-(ethane-1,2-diylidene)bis(2,4-dimethyl-6-(2-methyl-6-isopropylphenyl)aniline-κN)]palladium, chloro(methyl)[N,N'-(ethane-1,2-diylidene)bis{2,4-dimethyl-6-(2-ethyl-6-n-propylphenyl)aniline-κN}]palladium, chloro(methyl)[N,N'-(ethane-1,2-diylidene)bis(2,4-dimethyl-6-(2-ethyl-6-isopropylphenyl)aniline-κN)]palladium, chloro(methyl)[N,N'-(ethane-1,2-diylidene)bis{2,4-dimethyl-6-(1-naphthyl)aniline-κN}]palladium, chloro(methyl)[N,N'-(butane-2,3-diylidene)bis(aniline-κN)]palladium, chloro(methyl)[N,N'-(butane-2,3-diylidene)bis(2-methylaniline-κN)]palladium, chloro(methyl)[N,N'-(butane-2,3-diylidene)bis(2-ethylaniline-κN)]palladium, chloro(methyl)[N,N'-(butane-2,3-diylidene)bis(2-n-propylaniline-κN)]palladium, chloro(methyl)[N,N'-(butane-2,3-diylidene)bis(2-isopropylaniline-κN)]palladium, chloro(methyl)[N,N'-(butane-2,3-diylidene)bis(2-n-butylaniline-κN)]palladium, chloro(methyl)[N,N'-(butane-2,3-diylidene)bis(2-isobutylaniline-κN)]palladium, chloro(methyl)[N,N'-(butane-2,3-diylidene)bis(2-n-hexylaniline-κN)]palladium, chloro(methyl)[N,N'-(butane-2,3-diylidene)bis(4-methylaniline-κN)]palladium, chloro(methyl)[N,N'-(butane-2,3-diylidene)bis(2,6-dimethylaniline-κN)]palladium, chloro(methyl)[N,N'-(butane-2,3-diylidene)bis(2,6-diethylaniline-κN)]palladium, chloro(methyl)[N,N'-(butane-2,3-diylidene)bis(2,6-di-n-propylaniline-κN)]palladium, chloro(methyl)[N,N'-(butane-2,3-diylidene)bis(2,6-diisopropylaniline-κN)]palladium, chloro(methyl)[N,N'-(butane-2,3-diylidene)bis(2,6-di-n-butylaniline-κN)]palladium, chloro(methyl)[N,N'-(butane-2,3-diylidene)bis(2,6-diisobutylaniline-κN)]palladium, chloro(methyl)[N,N'-(butane-2,3-diylidene)bis(2,6-di-n-hexylaniline-κN)]palladium, chloro(methyl)[N,N'-(butane-2,3-diylidene)bis(2-methyl-6-ethylaniline-κN)]palladium, chloro(methyl)[N,N'-(butane-2,3-diylidene)bis(2-methyl-6-n-propylaniline-κN)]palladium, chloro(methyl)[N,N'-(butane-2,3-diylidene)bis(2-methyl-6-isopropylaniline-κN)]palladium, chloro(methyl)[N,N'-(butane-2,3-diylidene)bis(2-methyl-6-butylaniline-κN)]palladium, chloro(methyl)[N,N'-(butane-2,3-diylidene)bis(2-ethyl-6-n-propylaniline-κN)]palladium, chloro(methyl)[N,N'-(butane-2,3-diylidene)bis(2-ethyl-6-isopropylaniline-κN)]palladium, chloro(methyl)[N,N'-(butane-2,3-diylidene)bis(2-ethyl-6-n-butylaniline-κN)]palladium, chloro(methyl)[N,N'-(butane-2,3-diylidene)bis(2-n-propyl-6-isopropylaniline-κN)]palladium, chloro(methyl)[N,N'-(butane-2,3-diylidene)bis(2-n-propyl-6-n-butylaniline-κN)]palladium, chloro(methyl)[N,N'-(butane-2,3-diylidene)bis(2-isopropyl-6-n-butylaniline-κN)]palladium, chloro(methyl)[N,N'-(butane-2,3-diylidene)bis(2,4,6-trimethylaniline-κN)]palladium, chloro(methyl)[N,N'-(butane-2,3-diylidene)bis{2,4-dimethyl-6-(2-methylphenyl)aniline-κN}]palladium, chloro(methyl)[N,N'-(butane-2,3-diylidene)bis{2,4-dimethyl-6-(2-ethylphenyl)aniline-κN}]palladium, chloro(methyl)[N,N'-(butane-2,3-diylidene)bis{2,4-dimethyl-6-(2-n-propylphenyl)aniline-κN}]palladium, chloro(methyl)[N,N'-(butane-2,3-diylidene)bis{2,4-dimethyl-6-(2-isopropylphenyl)aniline-κN}]palladium, chloro(methyl)[N,N'-(butane-2,3-diylidene)bis{2,4-dimethyl-6-(2,6-dimethylphenyl)aniline-κN}]palladium, chloro(methyl)[N,N'-(butane-2,3-diylidene)bis{2,4-dimethyl-6-(2,6-diethylphenyl)aniline-κN}]palladium, chloro(methyl)[N,N'-(butane-2,3-diylidene)bis{2,4-dimethyl-6-(2,6-di-n-propylphenyl)aniline-κN}]palladium, chloro(methyl)[N,N'-(butane-2,3-diylidene)bis{2,4-dimethyl-6-(2,6-diisopropylphenyl)aniline-κN}]palladium, chloro(methyl)[N,N'-(butane-2,3-diylidene)bis{2,4-dimethyl-6-(2-methyl-6-ethylphenyl)aniline-κN}]palladium, chloro(methyl)[N,N'-(butane-2,3-diylidene)bis{2,4-dimethyl-6-(2-methyl-6-n-propylphenyl)aniline-κN}]palladium, chloro(methyl)[N,N'-(butane-2,3-diylidene)bis{2,4-dimethyl-6-(2-methyl-6-isopropylphenyl)aniline-κN}]palladium, chloro(methyl)[N,N'-(butane-2,3-diylidene)bis{2,4-dimethyl-6-(2-ethyl-6-n-propylphenyl)aniline κN}]palladium, chloro(methyl)[N,N'-(butane-2,3-diylidene)bis{2,4-dimethyl-6-(2-ethyl-6-isopropylphenyl)aniline-κN}]palladium, chloro(methyl)[N,N'-(butane-2,3-diylidene)bis{2,4-dimethyl-6-(1-naphthyl)aniline-κN}]palladium, chloro(methyl)[N,N'-(1,2-dihydroacenaphthylene-1,2-diylidene)bis(aniline-κN)]palladium, chloro(methyl)[N,N'-(1,2-dihydroacenaphthylene-1,2-diylidene)bis(2-methylaniline-κN)]palladium, chloro(methyl)[N,N'-(1,2-dihydroacenaphthylene-1,2-diylidene)bis(2-ethylaniline-κN)]palladium, chloro(methyl)[N,N'-(1,2-dihydroacenaphthylene-1,2-diylidene)bis(2-n-propylaniline-κN)]palladium, chloro(methyl)[N,N'-(1,2-dihydroacenaphthylene-1,2-diylidene)bis(2-isopropylaniline-κN)]palladium, chloro(methyl)[N,N'-(1,2-dihydroacenaphthylene-1,2-diylidene)bis(2-n-butylaniline-κN)]palladium, chloro(methyl)[N,N'-(1,2-dihydroacenaphthylene-1,2-diylidene)bis(2-isobutylaniline-κN)]palladium, chloro(methyl)[N,N'-(1,2-dihydroacenaphthylene-1,2-diylidene)bis(2-n-hexylaniline-κN)]palladium, chloro(methyl)[N,N'-(1,2-dihydroacenaphthylene-1,2-diylidene)bis(4-methylaniline-κN)]palladium, chloro(methyl)[N,N'-(1,2-dihydroacenaphthylene-1,2-diylidene)bis(2,6-dimethylaniline-κN)]palladium, chloro(methyl)[N,N'-(1,2-dihydroacenaphthylene-1,2-diylidene)bis(2,6-diethylaniline-κN)]palladium, chloro(methyl)[N,N'-(1,2-dihydroacenaphthylene-1,2-diylidene)bis(2,6-di-n-propylaniline-κN)]palladium, chloro(methyl)[N,N'-(1,2-dihydroacenaphthylene-1,2-diylidene)bis(2,6-diisopropylaniline-κN)]palladium, chloro(methyl)[N,N'-(1,2-dihydroacenaphthylene-1,2-diylidene)bis(2,6-di-n-butylaniline-κN)]palladium, chloro(methyl)[N,N'-(1,2-dihydroacenaphthylene-1,2-diylidene)bis(2,6-diisobutylaniline-κN)]palladium, chloro(methyl)[N,N'-(1,2-dihydroacenaphthylene-1,2-diylidene)bis(2,6-di-n-hexylaniline-κN)]palladium, chloro(methyl)[N,N'-(1,2-dihydroacenaphthylene-1,2-diylidene)bis(2,6-dichloroaniline-κN)]palladium, chloro(methyl)[N,N'-(1,2-dihydroacenaphthylene-1,2-diylidene)bis(2-methyl-6-ethylaniline-κN)]palladium, chloro(methyl)[N,N'-(1,2-dihydroacenaphthylene-1,2-diylidene)bis(2-methyl-6-n-propylaniline-κN)]palladium, chloro(methyl)[N,N'-(1,2-dihydroacenaphthylene-1,2-diylidene)bis(2-methyl-6-isopropylaniline-κN)]palladium, chloro(methyl)[N,N'-(1,2-dihydroacenaphthylene-1,2-diylidene)bis(2-methyl-6-butylaniline-κN)]palladium, chloro(methyl)[N,N'-(1,2-dihydroacenaphthylene-1,2-diylidene)bis(2-ethyl-6-n-propylaniline-κN)]palladium, chloro(methyl)[N,N'-(1,2- dihydroacenaphthylene-1,2-diylidene)bis(2-ethyl-6-isopropylaniline-κN)]palladium, chloro(methyl)[N,N'-(1,2-dihydroacenaphthylene-1,2-diylidene)bis(2-ethyl-6-n-butylaniline-κN)]palladium, chloro(methyl)[N,N'-(1,2-dihydroacenaphthylene-1,2-diylidene)bis(2-n-propyl-6-isopropylaniline-κN)]palladium, chloro(methyl)[N,N'-(1,2-dihydroacenaphthylene-1,2-diylidene)bis(2-n-propyl-6-n-butylaniline-κN)]palladium, chloro(methyl)[N,N'-(1,2-dihydroacenaphthylene-1,2-diylidene)bis(2-isopropyl-6-n-butylaniline-κN)]palladium, chloro(methyl)[N,N'-(1,2-dihydroacenaphthylene-1,2-diylidene)bis(2,4,6-trimethylaniline-κN)]palladium, chloro(methyl)[N,N'-(1,2-dihydroacenaphthylene-1,2-diylidene)bis{2,4-dimethyl-6-(2-methylphenyl)aniline-κN}]palladium, chloro(methyl)[N,N'-(1,2-dihydroacenaphthylene-1,2-diylidene)bis{2,4-dimethyl-6-(2-ethylphenyl)aniline-κN}]palladium, chloro(methyl)[N,N'-(1,2-dihydroacenaphthylene-1,2-diylidene)bis{2,4-dimethyl-6-(2-n-propylphenyl)aniline-κN}]palladium, chloro(methyl)[N,N'-(1,2-dihydroacenaphthylene-1,2-diylidene)bis{2,4-dimethyl-6-(2-isopropylphenyl)aniline-κN}]palladium, chloro(methyl)[N,N'-(1,2-dihydroacenaphthylene-1,2-diylidene)bis{2,4-dimethyl-6-(2,6-dimethylphenyl)aniline-κN}]palladium, chloro(methyl)[N,N'-(1,2-dihydroacenaphthylene-1,2-diylidene)bis{2,4-dimethyl-6-(2,6-diethylphenyl)aniline-κN}]palladium, chloro(methyl)[N,N'-(1,2-dihydroacenaphthylene-1,2-diylidene)bis{2,4-dimethyl-6-(2,6-di-n-propylphenyl)aniline-κN}]palladium, chloro(methyl)[N,N'-(1,2-dihydroacenaphthylene-1,2-diylidene)bis{2,4-dimethyl-6-(2,6-diisopropylphenyl)aniline-κN}]palladium, chloro(methyl)[N,N'-(1,2-dihydroacenaphthylene-1,2-diylidene)bis{2,4-dimethyl-6-(2-methyl-6-ethylphenyl)aniline-κN}]palladium, chloro(methyl)[N,N'-(1,2-dihydroacenaphthylene-1,2-diylidene)bis{2,4-dimethyl-6-(2-methyl-6-n-propylphenyl)aniline-κN}]palladium, chloro(methyl)[N,N'-(1,2-dihydroacenaphthylene-1,2-diylidene)bis{2,4-dimethyl-6-(2-methyl-6-isopropylphenyl)aniline-κN}]palladium, chloro(methyl)[N,N'-(1,2-dihydroacenaphthylene-1,2-diylidene)bis{2,4-dimethyl-6-(2-ethyl-6-n-propylphenyl)aniline-κN}]palladium, chloro(methyl)[N,N'-(1,2-dihydroacenaphthylene-1,2-diylidene)bis{2,4-dimethyl-6-(2-ethyl-6-isopropylphenyl)aniline-κN}]palladium, and chloro(methyl)[N,N'-(1,2-dihydroacenaphthylene-1,2-diylidene)bis{2,4-dimethyl-6-(1-naphthyl)aniline-κN}]palladium.

Examples of the transition metal compound represented by formula (4), wherein $M^1$ is a nickel atom, a cobalt atom, a rhodium atom or a ruthenium atom, are compounds obtained by replacing the term "palladium" of the above-exemplified palladium compounds with the term "nickel", "cobalt", "rhodium" or "ruthenium".

Examples of the transition metal compound represented by formula (4), wherein M is an iron atom, are 2,6-bis-[1-(2,6-dimethylphenylimino)ethyl]pyridineiron dichloride, 2,6-bis-[1-(2,6-diisopropylphenylimino)ethyl]pyridineiron dichloride, 2,6-bis-[1-(2,6-dichlorophenylimino)ethyl]pyridineiron dichloride, 2,6-bis-[1-(2-methyl-6-isopropylphenylimino)ethyl]pyridineiron dichloride, 2,6-bis-[1-(2-tert-butylphenylimino)ethyl]pyridineiron dichloride, [hydrotris(3,5-dimethylpyrazolyl)borate]iron chloride, [hydrotris(3,5-dimethylpyrazolyl)borate]iron bromide, [hydrotris(3,5-dimethylpyrazolyl)borate]iron iodide, [hydrotris(3,5-dimethylpyrazolyl)borate]iron methyl, [hydrotris(3,5-dimethylpyrazolyl)borate]iron ethyl, [hydrotris(3,5-dimethylpyrazolyl)borate]iron allyl, [hydrotris(3,5-dimethylpyrazolyl)borate]iron methallyl, [hydrotris(3,5-diethylpyrazolyl)borate]iron chloride, [hydrotris(3,5-diethylpyrazolyl)borate]iron bromide, [hydrotris(3,5-diethylpyrazolyl)borate]iron iodide, [hydrotris(3,5-diethylpyrazolyl)borate]iron methyl, [hydrotris(3,5-diethylpyrazolyl)borate]iron ethyl, [hydrotris(3,5-diethylpyrazolyl)borate]iron allyl, [hydrotris(3,5-diethylpyrazolyl)borate]iron methallyl, [hydrotris(3,5-di-tert-butylpyrazolyl)borate]iron chloride, [hydrotris(3,5-di-tert-butylpyrazolyl)borate]iron bromide, [hydrotris(3,5-di-tert-butylpyrazolyl)borate]iron iodide, [hydrotris(3,5-di-tert-butylpyrazolyl)borate]iron methyl, [hydrotris(3,5-di-tert-butylpyrazolyl)borate]iron ethyl, [hydrotris(3,5-di-tert-butylpyrazolyl)borate]iron allyl, and [hydrotris(3,5-di-tert-butylpyrazolyl)borate]iron methallyl.

Examples of the transition metal compound represented by the formula (4), wherein $M^1$ is a cobalt atom or a nickel atom, are compounds obtained by replacing the term "iron" of the above-exemplified iron compounds with the term "cobalt" or "nickel".

The above-mentioned transition metal compounds may be used in combination of two or more thereof.

The transition metal compound is preferably a compound represented by the following formula [I]:

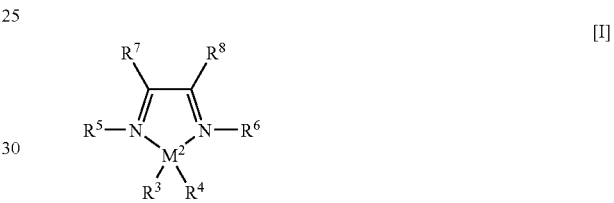

wherein $M^2$ is a transition metal atom of Group 10 of the Periodic Table of the elements; $R^3$ and $R^4$ are independently of each other a hydrogen atom, a halogen atom, an alkyl group, an aralkyl group, an aryl group, a silyl group, a siloxy group, an alkoxy group, an aralkyloxy group or an aryloxy group; $R^5$ and $R^6$ are independently of each other a hydrocarbyl group having 1 to 30 carbon atoms; and $R^7$ and $R^8$ are independently of each other a hydrogen atom or a hydrocarbyl group having 1 to 20 carbon atoms, and $R^7$ and $R^8$ may be linked with each other to form a ring.

$M^2$ is preferably a nickel atom or a palladium atom, and further preferably a palladium atom.

Examples of the halogen atom of $R^3$ and $R^4$ are a fluorine atom, a chlorine atom, a bromine atom, and an iodine atom. Among them, preferred is a chlorine atom or a bromine atom.

Examples of the alkyl group of $R^3$ and $R^4$ are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group. Among them, preferred is a linear alkyl group, more preferred is a linear alkyl group having 1 to 12 carbon atoms, and further preferred is a methyl group.

Examples of the aralky group of $R^3$ and $R^4$ are a benzyl group and a phenethyl group. Among them, preferred is a benzyl group.

Examples of the aryl group of $R^3$ and $R^4$ are a phenyl group, a naphthyl group, a 4-tolyl group, a mesityl group, and a biphenyl group. Among them, preferred is a phenyl group, a 4-tolyl group or a mesityl group.

Examples of the silyl group of $R^3$ and $R^4$ are monosubstituted silyl group such as a methylsilyl group, an ethylsilyl group, and a phenylsilyl group; disubstituted silyl groups such as a dimethylsilyl group, a diethylsilyl group, and a diphenylsilyl group; and trisubstituted silyl groups such as a trimethylsilyl group, a trimethoxysilyl group, a dimethylmethoxysilyl group, a methyldimethoxysilyl group, a triethylsilyl group, a triethoxysilyl group, a tri-n-propylsilyl group, a triisopropylsilyl group, a tri-n-butylsilyl group, a tri-sec-butylsilyl group, a tert-butyldimethylsilyl group, a triisobutylsilyl group, a tert-butyldiphenylsilyl group, a cyclohexyldimethylsilyl group, a tricyclohexylsilyl group, and a triphenylsilyl group. Among them, preferred are trisubstituted silyl groups, and more preferred is a trimethylsilyl group, a triethylsilyl group, a triphenylsilyl group, a tert-butyldimethylsilyl group, a tert-butyldiphenylsilyl group, a cyclohexyldimethylsilyl group, or a triisopropylsilyl group.

Examples of the siloxy group of $R^3$ and $R^4$ are a trimethylsiloxy group, a trimethoxysiloxy group, a dimethylmethoxysiloxy group, a methyldimethoxysiloxy group, a triethylsiloxy group, a triethoxysiloxy group, a tri-n-propylsiloxy group, a triisopropylsiloxy group, a tri-n-butylsiloxy group, a tri-sec-butylsiloxy group, a tert-butyldimethylsiloxy group, a triisobutylsiloxy group, a tert-butyldiphenylsiloxy group, a cyclohexyldimethylsiloxy group, a tricyclohexylsiloxy group, and a triphenylsiloxy group. Among them, preferred is a trimethylsiloxy group, a triethylsiloxy group, a triphenylsiloxy group, a tert-butyldimethylsiloxy group, a tert-butyldiphenylsiloxy group, a cyclohexyldimethylsiloxy group.

Examples of the alkoxy group of $R^3$ and $R^4$ are a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-dodecyloxy group, a n-pentadecyloxy group, and a n-eicosyloxy group. Among them, preferred is an alkoxy group having 1 to 20 carbon atoms, and more preferred is a methoxy group, an ethoxy group, an isopropoxy group, or a tert-butoxy group.

Examples of the aralkyloxy group of $R^3$ and $R^4$ are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl) methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl) methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl) methoxy group, a (n-decylphenyl)methoxy group, a naphthylmethoxy group, and an anthrathenylmethoxy group. Among them, preferred is a benzyloxy group.

Examples of the aryloxy group of $R^3$ and $R^4$ are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a naphthoxy group, and an anthrathenoxy group. Among them, preferred is an aryloxy group having 6 to 20 carbon atoms.

$R^3$ and $R^4$ are preferably a hydrogen atom, a halogen atom, an alkyl group or an aryl group; more preferably a hydrogen atom, a halogen atom or a non-substituted linear alkyl group having 1 to 12 carbon atoms; and particularly preferred is a chlorine atom or a methyl group.

Examples of the hydrocarbyl group having 1 to 30 carbon atoms of $R^5$ and $R^6$ are an alkyl group, an aralkyl group and an aryl group. Those groups may have a substituent such as a halogen atom, a hydrocarbyloxy group, a nitro group, a sulfonyl group, and a silyl group.

Examples of the alkyl group of $R^5$ and $R^6$ are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group. Among them, preferred is a branched alkyl group, more preferred is a branched alkyl group having 1 to 12 carbon atoms, and further preferred is an isopropyl group or a tert-butyl group.

Examples of the aralkyl group of $R^5$ and $R^6$ are a benzyl group and a phenethyl group. Among them, preferred is a benzyl group.

Examples of the aryl group of $R^5$ and $R^6$ are a phenyl group, a 2-methylphenyl group, a 2-ethylphenyl group, a 2-n-propylphenyl group, a 2-isopropylphenyl group, a 2-n-butylphenyl group, a 2-isobutylphenyl group, a 2-n-hexylphenyl group, a 4-methylphenyl group, a 2,6-dimethylphenyl group, a 2,6-diethylphenyl group, a 2,6-di-n-propylphenyl group, a 2,6-diisopropylphenyl group, a 2,6-di-n-butylphenyl group, a 2,6-diisobutylphenyl group, a 2,6-di-n-hexylphenyl group, a 2-methyl-6-ethylphenyl group, a 2-methyl-6-n-propylphenyl group, a 2-methyl-6-isopropylphenyl group, a 2-methyl-6-butylphenyl group, a 2-ethyl-6-n-propylphenyl group, a 2-ethyl-6-isopropylphenyl group, a 2-ethyl-6-n-butylphenyl group, a 2-n-propyl-6-isopropylphenyl group, a 2-n-propyl-6-n-butylphenyl group, a 2-isopropyl-6-n-butylphenyl group, a 2,4,6-trimethylphenyl group, a 2,4-dimethyl-6-(2-methylphenyl)phenyl group, a 2,4-dimethyl-6-(2-ethylphenyl) phenyl group, a 2,4-dimethyl-6-(2-n-propylphenyl)phenyl group, a 2,4-dimethyl-6-(2-isopropylphenyl)phenyl group, a 2,4-dimethyl-6-(2,6-dimethylphenyl)phenyl group, a 2,4-dimethyl-6-(2,6-diethylphenyl)phenyl group, a 2,4-dimethyl-6-(2,6-di-n-propylphenyl)phenyl group, a 2,4-dimethyl-6-(2,6-diisopropylphenyl)phenyl group, a 2,4-dimethyl-6-(2-methyl-6-ethylphenyl)phenyl group, a 2,4-dimethyl-6-(2-methyl-6-n-propylphenyl)phenyl group, a 2,4-dimethyl-6-(2-methyl-6-isopropylphenyl)phenyl group, a 2,4-dimethyl-6-(2-ethyl-6-n-propylphenyl)phenyl group, a 2,4-dimethyl-6-(2-ethyl-6-isopropylphenyl)phenyl group, and a 2,4-dimethyl-6-(1-naphthyl)phenyl group. Among them, preferred is an aryl group having 6 to 30 carbon atoms, and more preferred is an aryl group having 7 to 30 carbon atoms.

Examples of the hydrocarbyl group having 1 to 20 carbon atoms of $R^7$ and $R^8$ are an alkyl group and an aryl group. Those groups may have a substituent such as a halogen atom, a hydrocarbyloxy group, a nitro group, a sulfonyl group, and a silyl group.

Examples of the alkyl group of $R^7$ and $R^8$ are linear alkyl groups such as a methyl group, an ethyl group, and a n-butyl group; branched alkyl groups such as an isopropyl group, an isobutyl group, a tert-butyl group, and a neopentyl group; and cyclic alkyl groups such as a cyclohexyl group and a cyclooctyl group. Among them, preferred is a linear alkyl group, more preferred is a linear alkyl group having 1 to 12 carbon atoms, and further preferred is a methyl group or an ethyl group.

Examples of the aryl group of $R^7$ and $R^8$ are a phenyl group, a naphthyl group, a 4-tolyl group, and a mesityl group. Among them, preferred is an aryl group having 6 to 20 carbon atoms, more preferred is an aryl group having 6 to 12 carbon atoms, and further preferred is a phenyl group or a mesityl group.

When $R^7$ and $R^8$ are linked with each other to form a ring, examples of the ring are an aliphatic ring and an aromatic ring. Those rings may have a substituent. Examples of a divalent group forming the aliphatic ring are a 1,2-ethylene group, a 1,2-cyclohexylene group, a 1,2-norbornene group, a 2,3-butene group, a 2,3-dimethyl-2,3-butene group, and a 2,4-pentene group. Examples of a divalent group forming the aromatic ring are a 1,2-phenylene group and a naphthalen-1,8-diyl group. Among them, preferred is a naphthalen-1,8-diyl group. One bond contained in each of these divalent groups is linked with the $R^7$-carrying carbon atom in formula [I], and the other bond contained therein is linked with the $R^8$-carrying carbon atom therein.

A transition metal compound used in the present invention is preferably a compound represented by the following formula [II] encompassed by the formula [I], from a viewpoint of production of a polymer containing more than 25% by mol of diisotactic triad, and preferably threodiisotactic triad:

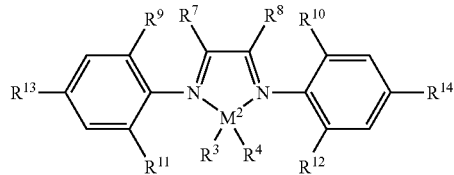

[II]

wherein $M^2$, $R^3$, $R^4$, $R^7$ and $R^8$ are the same as those defined in the above formula [I]; $R^9$ and $R^{10}$ are independently of each other a hydrogen atom, a halogen atom, an alkyl group, an aralkyl group, a silyl group, a siloxy group, an alkoxy group, an aralkyloxy group, an amino group, an amide group, an imide group, or a hydrocarbylthio group; $R^{11}$ and $R^{12}$ are independently of each other an aryl group having 7 to 20; and $R^{13}$ and $R^{14}$ are independently of each other a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group.

$R^9$ and $R^{10}$ are preferably an alkyl group, further preferably an alkyl group having 1 to 12 carbon atoms, and particularly preferably a methyl group, an ethyl group, a n-propyl group, an isopropyl group, a n-butyl group, an isobutyl group, or a tert-butyl group.

Examples of $R^{11}$ and $R^{12}$ are a 2-methylphenyl group, a 3-methylphenyl group, a 4-methylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a naphthyl group, a 2-methyl-1-naphthyl group, a 3-methyl-1-naphthyl group, a 4-methyl-1-naphthyl group, a 2,3-dimethyl-1-naphthyl group, a 2,4-dimethyl-1-naphthyl group, a 2,5-dimethyl-1-naphthyl group, a 2,6-dimethyl-1-naphthyl group, a 3,4-dimethyl-1-naphthyl group, a 3,5-dimethyl-1-naphthyl group, a 3,6-dimethyl-1-naphthyl group, an anthracenyl group, a 2-methyl-1-anthracenyl group, a 3-methyl-10-anthracenyl group, a 4-methyl-10-anthracenyl group, a 2,3-dimethyl-10-anthracenyl group, a 2,4-dimethyl-10-anthracenyl group, a 2,5-dimethyl-10-anthracenyl group, a 2,6-dimethyl-10-anthracenyl group, a 3,4-dimethyl-10-anthracenyl group, a 3,5-dimethyl-10-anthracenyl group, a 3,6-dimethyl-10-anthracenyl group, and 2-methyl-10-anthracenyl group. Among them, preferred is a substituent-having phenyl group, a naphthyl group or an anthracenyl group, and further preferred is a 2-methylphenyl group or a naphthyl group.

$R^{13}$ and $R^{14}$ are preferably a hydrogen atom or an alkyl group, more preferably a hydrogen atom or an alkyl group having 1 to 12 carbon atoms, and further preferably a methyl group, an ethyl group, a n-propyl group, an isopropyl group, a n-butyl group, or an isobutyl group.

Also, a transition metal compound used in the present invention is preferably a compound represented by the following formula [III] encompassed by the formula [I], from a viewpoint of production of a polymer containing more than 25% by mol of disyndiotactic triad, and preferably threodisyndiotactic triad:

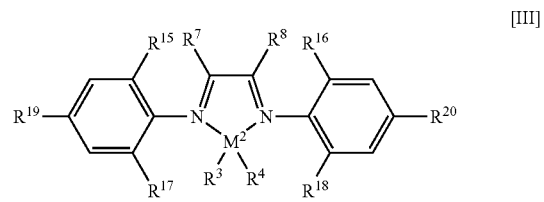

[III]

wherein $M^2$, $R^3$, $R^4$, $R^7$ and $R^8$ are the same as those defined in the above formula [I]; $R^{15}$, $R^{16}$, $R^{17}$ and $R^{18}$ are independently of one another a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group; and $R^{19}$ and $R^{20}$ are independently of each other a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group.

$R^{15}$, $R^{16}$, $R^{17}$ and $R^{18}$ are preferably a hydrogen atom, an alkyl group or an aryl group, more preferably a hydrogen atom, an alkyl group having 1 to 12 carbon atoms, or an aryl group having 6 to 20 carbon atoms, and further preferably a hydrogen atom, a methyl group, an ethyl group, a n-propyl group, an isopropyl group, a n-butyl group, an isobutyl group, a tert-butyl group, or a phenyl group.

$R^{19}$ and $R^{20}$ are preferably a hydrogen atom, an alkyl group or an aryl group, more preferably a hydrogen atom, an alkyl group having 1 to 12 carbon atoms, or an aryl group having 6 to 20 carbon atoms, and further preferably a hydrogen atom, a methyl group, an ethyl group, a n-propyl group, an isopropyl group, a n-butyl group, an isobutyl group, a tert-butyl group, or a phenyl group.

Compounds represented by the following formula [IV] are also preferable as a transition metal compound used in the present invention:

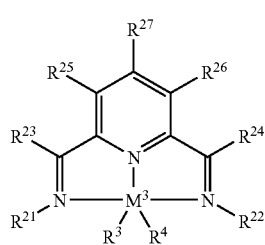

[IV]

wherein $M^3$ is a transition metal atom of Group 8 to 11 of the Periodic Table of the elements; $R^3$ and $R^4$ are the same as those defined in the above formula [I]; and $R^{21}$ to $R^{27}$ are independently of one another a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group, and any two or more of $R^{21}$ to $R^{27}$ may be linked with one another to form a ring.

$M^3$ is preferably an iron atom, a ruthenium atom, a cobalt atom, a rhodium atom, a nickel atom, a palladium atom, or a copper atom, and further preferably an iron atom or a cobalt atom.

Examples of the halogen atom of $R^{21}$ to $R^{27}$ are a fluorine atom, a chlorine atom, a bromine atom, and an iodine atom. Among them, preferred is a chlorine atom or a bromine atom.

Examples of the alkyl group of $R^{21}$ to $R^{27}$ are linear alkyl groups such as a methyl group, an ethyl group, a n-propyl group, a n-butyl group, and a n-pentyl group; branched alkyl groups such as an isopropyl group, an isobutyl group, a tert-butyl group, and a neopentyl group; and cyclic alkyl groups such as a cyclopropyl group, a cyclobutyl group, a cyclopentyl group, a cyclohexyl group and a cyclooctyl group. Among them, preferred is a branched alkyl group, more preferred is a branched alkyl group having 1 to 12 carbon atoms, and further preferred is an isopropyl group or a tert-butyl group.

Examples of the aralkyl group of $R^{21}$ to $R^{27}$ are a benzyl group and a phenethyl group. Among them, preferred is a benzyl group.

Examples of the aryl group of $R^{21}$ to $R^{27}$ are a phenyl group, a 2-methylphenyl group, a 2-ethylphenyl group, a 2-n-propylphenyl group, a 2-isopropylphenyl group, a 2-n-butylphenyl group, a 2-isobutylphenyl group, a 2-tert-butylphenyl group, a 2-n-hexylphenyl group, a 2-cyclohexylphenyl group, a 3-methylphenyl group, a 3-ethylphenyl group, a 3-n-propylphenyl group, a 3-isopropylphenyl group, a 3-n-butylphenyl group, a 3-isobutylphenyl group, a 3-tert-butylphenyl group, a 3-n-hexylphenyl group, a 3-cyclohexylphenyl group, a 4-methylphenyl group, a 4-ethylphenyl group, a 4-n-propylphenyl group, a 4-isopropylphenyl group, a 4-n-butylphenyl group, a 4-isobutylphenyl group, a 4-tert-butylphenyl group, a 4-n-hexylphenyl group, a 4-cyclohexylphenyl group, a 2,6-dimethylphenyl group, a 2,6-diethylphenyl group, a 2,6-di-n-propylphenyl group, a 2,6-diisopropylphenyl group, a 2,6-di-n-butylphenyl group, a 2,6-diisobutylphenyl group, a 2,6-di-tert-butylphenyl group, a 2,6-di-n-hexylphenyl group, a 2,6-dicyclohexylphenyl group, a 2-methyl-6-ethylphenyl group, a 2-methyl-6-n-propylphenyl group, a 2-methyl-6-isopropylphenyl group, a 2-methyl-6-n-butylphenyl group, a 2-methyl-6-isobutylphenyl group, a 2-methyl-6-tert-butylphenyl group, a 2-methyl-6-n-hexylphenyl group, a 2-methyl-6-cyclohexylphenyl group, a 2-ethyl-6-n-propylphenyl group, a 2-ethyl-6-isopropylphenyl group, a 2-ethyl-6-n-butylphenyl group, a 2-ethyl-6-isobutylphenyl group, a 2-ethyl-6-tert-butylphenyl group, a 2-ethyl-6-n-hexylphenyl group, a 2-ethyl-6-cyclohexylphenyl group, a 2-n-propyl-6-isopropylphenyl group, a 2-n-propyl-6-n-butylphenyl group, a 2-n-propyl-6-isobutylphenyl group, a 2-n-propyl-6-tert-butylphenyl group, a 2-n-propyl-6-n-hexylphenyl group, a 2-n-propyl-6-cyclohexylphenyl group, a 2-isopropyl-6-n-butylphenyl group, a 2-isopropyl-6-isobutylphenyl group, a 2-isopropyl-6-tert-butylphenyl group, a 2-isopropyl-6-n-hexylphenyl group, a 2-isopropyl-6-cyclohexylphenyl group, a 2-n-butyl-6-isobutylphenyl group, a 2-n-butyl-6-tert-butylphenyl group, a 2-n-butyl-6-n-hexylphenyl group, a 2-n-butyl-6-cyclohexylphenyl group, a 2-isobutyl-6-tert-butylphenyl group, a 2-isobutyl-6-n-hexylphenyl group, a 2-isobutyl-6-cyclohexylphenyl group, a 2-tert-butyl-6-n-hexylphenyl group, a 2-tert-butyl-6-cyclohexylphenyl group, a 2-n-hexyl-6-cyclohexylphenyl group, a 2,4-diisopropylphenyl group, a 2,4-di-n-butylphenyl group, a 2,4-diisobutylphenyl group, a 2,4-di-tert-butylphenyl group, a 2,4-di-n-hexylphenyl group, a 2,4-dicyclohexylphenyl group, a 2-ethyl-4-methylphenyl group, a 2-n-propyl-4-methylphenyl group, a 2-isopropyl-4-methylphenyl group, a 2-n-butyl-4-methylphenyl group, a 2-isobutyl-4-methylphenyl group, a 2-tert-butyl-4-methylphenyl group, a 2-n-hexyl-4-methylphenyl group, a 2-cyclohexyl-4-methylphenyl group, a 2-n-propyl-4-ethylphenyl group, a 2-isopropyl-4-ethylphenyl group, a 2-n-butyl-4-ethylphenyl group, a 2-isobutyl-4-ethylphenyl group, a 2-tert-butyl-4-ethylphenyl group, a 2-n-hexyl-4-ethylphenyl group, a 2-cyclohexyl-4-ethylphenyl group, a 2-isopropyl-4-n-propylphenyl group, a 2-n-butyl-4-n-propylphenyl group, a 2-isobutyl-4-n-propylphenyl group, a 2-tert-butyl-4-n-propylphenyl group, a 2-n-hexyl-4-n-propylphenyl group, a 2-cyclohexyl-4-n-propylphenyl group, a 2-n-butyl-4-isopropylphenyl group, a 2-isobutyl-4-isopropylphenyl group, a 2-tert-butyl-4-isopropylphenyl group, a 2-n-hexyl-4-isopropylphenyl group, a 2-cyclohexyl-4-isopropylphenyl group, a 2-isobutyl-4-n-butylphenyl group, a 2-tert-butyl-4-n-butylphenyl group, a 2-n-hexyl-4-n-butylphenyl group, a 2-cyclohexyl-4-n-butylphenyl group, a 2-tert-butyl-4-isobutylphenyl group, a 2-n-hexyl-4-isobutylphenyl group, a 2-cyclohexyl-4-isobutylphenyl group, a 2-n-hexyl-4-tert-butylphenyl group, a 2-cyclohexyl-4-tert-butylphenyl group, a 2-cyclohexyl-4-n-hexylphenyl group, a 2,5-dimethylphenyl group, a 2,5-diethylphenyl group, a 2,5-di-n-propylphenyl group, a 2,5-diisopropylphenyl group, a 2,5-di-n-butylphenyl group, a 2,5-diisobutylphenyl group, a 2,5-di-tert-butylphenyl group, a 2,5-di-n-hexylphenyl group, a 2,5-dicyclohexylphenyl group, a 2,4,6-trimethylphenyl group, a 2,4,6-triethylphenyl group, a 2,4,6-tri-n-propylphenyl group, a 2,4,6-triisopropylphenyl group, a 2,4,6-tri-n-butylphenyl group, a 2,4,6-triisobutylphenyl group, a 2,4,6-tri-tert-butylphenyl group, a 2,4,6-tri-n-hexylphenyl group, a 2,4,6-tricyclohexylphenyl group, a 2,6-diethyl-4-methylphenyl group, a 2,6-di-n-propyl-4-methylphenyl group, a 2,6-diisopropyl-4-methylphenyl group, a 2,6-di-n-butyl-4-methylphenyl group, a 2,6-diisobutyl-4-methylphenyl group, a 2,6-di-tert-butyl-4-methylphenyl group, a 2,6-di-n-hexyl-4-methylphenyl group, a 2,6-dicyclohexyl-4-methylphenyl group, a 2,4-dimethyl-6-(2-methylphenyl)phenyl group, a 2,4-dimethyl-6-(2-ethylphenyl)phenyl group, a 2,4-dimethyl-6-(2-n-propylphenyl)phenyl group, a 2,4-dimethyl-6-(2-isopropylphenyl)phenyl group, a 2,4-dimethyl-6-(2,6-dimethylphenyl)phenyl group, a 2,4-dimethyl-6-(2,6-diethylphenyl)phenyl group, a 2,4-dimethyl-6-(2,6-di-n-propylphenyl)phenyl group, a 2,4-dimethyl-6-(2,6-diisopropylphenyl)phenyl group, a 2,4-dimethyl-6-(2-methyl-6-ethylphenyl)phenyl group, a 2,4-dimethyl-6-(2-methyl-6-n-propylphenyl)phenyl group, a 2,4-dimethyl-6-(2-methyl-6-isopropylphenyl)phenyl group, a 2,4-dimethyl-6-(2-ethyl-6-n-propylphenyl)phenyl group, a 2,4-dimethyl-6-(2-ethyl-6-isopropylphenyl)phenyl group, and a 2,4-dimethyl-6-(1-naphthyl)phenyl group.

Examples of the silyl group of $R^{21}$ to $R^{27}$ are mono-substituted silyl groups such as a methylsilyl group, an ethylsilyl group, and a phenylsilyl group; di-substituted silyl groups such as a dimethylsilyl group, a diethylsilyl group, and a diphenylsilyl group; and tri-substituted silyl groups such as a trimethylsilyl group, a trimethoxysilyl group, a dimethylmethoxysilyl group, a methyldimethoxysilyl group, a triethylsilyl group, a triethoxysilyl group, a tri-n-propylsilyl group, a triisopropylsilyl group, a tri-n-butylsilyl group, a tri-sec-butylsilyl group, a tert-butyldimethylsilyl group, a triisobutylsilyl group, a tert-butyldiphenylsilyl group, a cyclohexyldimethylsilyl group, a tricyclohexylsilyl group, and a triphenylsilyl group. Among them, preferred are tri-substituted silyl groups, and further preferred is a trimethylsilyl group, a triethylsilyl group, a triphenylsilyl group, a tert-butyldimethylsilyl group, a tert-butyldiphenylsilyl group, a cyclohexyldimethylsilyl group, or a triisopropylsilyl group.

Examples of the siloxy group of $R^{21}$ to $R^{27}$ are a trimethylsiloxy group, a trimethoxysiloxy group, a dimethylmethoxysiloxy group, a methyldimethoxysiloxy group, a triethylsiloxy group, a triethoxysiloxy group, a tri-n-propylsiloxy group, a triisopropylsiloxy group, a tri-n-butylsiloxy group, a tri-sec-butylsiloxy group, a tert-butyldimethylsiloxy group, a triisobutylsiloxy group, a tert-butyldiphenylsiloxy group, a cyclohexydimethylsiloxy group, a tricyclohexylsiloxy group, and a triphenylsiloxy group. Among them, preferred is a trialkylsiloxy group, and further preferred is a trimethylsiloxy group, a triethylsiloxy group, and a triphenylsiloxy group, a tert-butyldimethylsiloxy group, a tert-butyldiphenylsiloxy group, a cyclohexyldimethylsiloxy group, or a triisopropylsiloxy group.

Examples of the alkoxy group of $R^{21}$ to $R^{27}$ are a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-dodecyloxy group, a n-pentadecyloxy group, and a n-eicosyloxy group. Among them, preferred is a methoxy group, an ethoxy group, an isopropoxy group, or a tert-butoxy group.

Examples of the aralkyloxy group of $R^{21}$ to $R^{27}$ are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group, and an anthrathenylmethoxy group. Among them, preferred is a benzyloxy group.

Examples of the aryloxy group of $R^{21}$ to $R^{27}$ are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a naphthoxy group, and an anthrathenoxy group.

Examples of the amino group of $R^{21}$ to $R^{27}$ are linear alkylamino groups such as an N-methylamino group, an N-ethylamino group, an N-n-butylamino group, an N,N-dimethylamino group, an N,N-diethylamino group, and an N,N-di-n-butylamino group; branched alkylamino groups such as an N,N-diisopropylamino group, an N,N-diisobutylamino group, an N,N-di-tert-butylamino group, and an N,N-dineopentylamino group; and cyclic alkylamino groups such as an N,N-dicyclohexylamino group and an N,N-dicyclooctylamino group.

Examples of the amide group of $R^{21}$ to $R^{27}$ are an ethanamide group, an N-n-butylethanamide group, an N-methylethanamide group, an N-ethylethanamide group, an N-n-butylhexanamide group, an isopropanamide group, an isobutanamide group, a tert-butanamide group, a neopentanamide group, a cyclohexanamide group, and a cyclooctanamide group.

Examples of the imide group of $R^2$ to $R^{27}$ are a succinimide group, a maleimide group, and a phthalimide group.

Examples of the hydrocarbylthio group of $R^{21}$ to $R^{27}$ are alkylthio groups such as a methylthio group, an ethylthio group, an isopropylthio group, and a tert-butylthio group; arylthio groups such as a phenylthio group and a naphthylthio group; and aralkylthio groups such as a benzylthio group and a 9-fluorenylmethylthio group.

$R^{21}$ to $R^{27}$ may have one or more substituents such as a halogen atom, an alkoxy group, an aryloxy group, an aralkyloxy group, a nitro group, an amino group, an amide group, an imide group, a silyl group, a siloxy group, a sulfonyl group, and a hydrocarbylthio group.

When any two or more of $R^{21}$ to $R^{27}$ are linked with one another to form a ring, examples of the ring are an aliphatic ring and an aromatic ring. Those rings may have one or more substituents such as a halogen atom, an alkoxy group, an aryloxy group, an aralkyloxy group, a nitro group, an amino group, an amide group, an imide group, a silyl group, a siloxy group, a sulfonyl group, and a hydrocarbylthio group.

When any two of $R^{21}$ to $R^{27}$ are linked with each other to form an aliphatic ring, examples of a divalent group forming the aliphatic ring are a methylene group, an ethane-1,2-diyl group, a propane-1,3-diyl group, a propane-1,2-diyl group, a butane-1,2-diyl group, a butane-1,3-diyl group, a butane-1,4-diyl group, a pentane-1,2-diyl group, a pentane-1,3-diyl group, a pentane-1,4-diyl group, a pentane-1,5-diyl group, an ethylene-1,2-diyl group, a cyclohexane-1,2-diyl group, a cyclohexane-1,3-diyl group, a norbornane-1,2-diyl group, a norbornane-1-ene-1,2-diyl group, a butane-1-ene-1,2-diyl group, a butane-1-ene-1,3-diyl group, a butane-1-ene-2,3-diyl group, a butane-2-ene-1,2-diyl group, a butane-2-ene-1,3-diyl group, a butane-2-ene-2,3-diyl group, a butane-1,3-diene-1,2-diyl group, a butane-1,3-diene-1,3-diyl group, a butane-1,3-diene-1,4-diyl group, a dimethyl-2,3-butene-2,3-diyl group, and a pentene-2,4-diyl group.

When any two of $R^{21}$ to $R^{27}$ are linked with each other to form an aromatic ring, examples of a divalent group forming the aromatic ring are a benzen-1,2-diyl group, a 3-methylbenzen-1,2-diyl group, a 4-methylbenzen-1,2-diyl group, a 3-ethylbenzen-1,2-diyl group, a 4-ethylbenzen-1,2-diyl group, a 3-n-propylbenzen-1,2-diyl group, a 4-n-propylbenzen-1,2-diyl group, a 3-n-butylbenzen-1,2-diyl group, a 4-n-butylbenzen-1,2-diyl group, a 3-isopropylbenzen-1,2-diyl group, a 4-isopropylbenzen-1,2-diyl group, a 3-isobutylbenzen-1,2-diyl group, a 4-isobutylbenzen-1,2-diyl group, a 3-tert-butylbenzen-1,2-diyl group, a 4-tert-butylbenzen-1,2-diyl group, a benzen-1,3-diyl group, a 2-methylbenzen-1,3-diyl group, a 4-methylbenzen-1,3-diyl group, a biphenyl-2,2'-diyl group, a benzene-1,2-dimethylene group, a benzene-1,3-dimethylene group, and a naphthalen-1,8-diyl group.

One bond contained in each of the above-mentioned divalent groups is linked with a carbon atom carrying one of $R^{21}$ to $R^{27}$, and the other bond contained therein is linked with a carbon atom carrying another of $R^{21}$ to $R^{27}$, An organoaluminum compound in the present invention may be a compound known in the art. Examples of the organoaluminum compound are the following compounds (1) to (3), and a combination of two or more thereof:

(1) an organoaluminum compound represented by the formula, $E^1_d AlX^2_{3-d}$;

(2) a cyclic alumoxane represented by the formula, $\{-Al(E^2)-O-\}_e$; and (3) a linear alumoxane represented by the formula, $E^3\{-Al(E^3)-O-\}_f AlE^3_2$, wherein $E^1$, $E^2$ and $E^3$ are independently of one another a hydrocarbyl group, and when plural $E^1$s, $E^2$s or $E^3$s exist, they are the same as, or different from one another; $X^2$ is a hydrogen atom or a halogen atom, and when plural Xs exist, they are the same as, or different from one another; d is a number satisfying $0<d\leq 3$; e is an integer of 2 or more, and preferably an integer of 2 to 40; and f is an integer of 1 or more, and preferably an integer of 1 to 40.

The hydrocarbyl group of $E^1$, $E^2$ and $E^3$ is preferably a hydrocarbyl group having 1 to 8 carbon atoms, and more preferably an alkyl group having 1 to 8 carbon atoms. Examples of the alkyl group of $E^1$, $E^2$ and $E^3$ are a methyl group, an ethyl group, a n-propyl group, an isopropyl group, a n-butyl group, an isobutyl group, a n-pentyl group, and a neopentyl group. Among them, preferred is a methyl group or an isobutyl group.

Examples of the above-mentioned organoaluminum compound (1) are trialkylaluminums such as trimethylaluminum, triethylaluminum, tripropylaluminum, triisobutylaluminum, and trihexylaluminum; dialkylaluminum chlorides such as dimethylaluminum chloride, diethylaluminum chloride, dipropylaluminum chloride, diisobutylaluminum chloride and dihexylaluminum chloride; alkylaluminum dichlorides such as methylaluminum dichloride, ethylaluminum dichloride, propylaluminum dichloride, isobutylaluminum dichloride and hexylaluminum dichloride; and dialkylaluminum hydrides such as dimethylaluminum hydride, diethylaluminum hydride, dipropylaluminum hydride, diisobutylaluminum hydride and dihexylaluminum hydride. Among them, preferred is a trialkylaluminum, and more preferred is triethylaluminum or triisobutylaluminum.

The above-mentioned cyclic alumoxane (2) and linear alumoxane (3) can be produced according to various processes. Those processes are not particularly limited, and may be those known in the art. Examples of the process are (i) a process comprising the step of contacting a solution of a trialkylaluminum such as trimethylaluminum in a suitable organic solvent such as benzene and an aliphatic hydrocarbon with water, and (ii) a process comprising the step of contacting a trialkylaluminum such as trimethylaluminum with a crystal water-containing metal salt such as copper sulfate hydrate.

A boron compound in the present invention may be a compound known in the art. Examples of the boron compound are the following compounds (1) to (3), and a combination of two or more thereof:

(1) a boron compound represented by the formula, $BQ^1Q^2Q^3$;

(2) a boron compound represented by the formula, $G^+(BQ^1Q^2Q^3Q^4)^-$; and (3) a boron compound represented by the formula, $(J-H)^+(BQ^1Q^2Q^3Q^4)^-$;

wherein B is a trivalent boron atom; $Q^1$, $Q^2$, $Q^3$ and $Q^4$ are independently of one another a halogen atom, a hydrocarbyl group, a halogenated hydrocarbyl group, a silyl group, a siloxy group, an alkoxy group, an amino group, an amido group, or an imido group; $G^+$ is an inorganic or organic cation; J is a neutral Lewis base; and $(J-H)^+$ is a Broensted acid.

$Q^1$, $Q^2$, $Q^3$ and $Q^4$ in the above-mentioned formulas are preferably a halogen atom, a hydrocarbyl group having 1 to 20 carbon atoms, a halogenated hydrocarbyl group having 1 to 20 carbon atoms, a silyl group having 1 to 20 carbon atoms, a siloxy group having 1 to 20 carbon atoms, a $C_{2-20}$ hydrocarbyl group-carrying amino group, a $C_{2-20}$ hydrocarbyl group-carrying amido group, or a $C_{2-20}$ hydrocarbyl group-carrying imido group; more preferably a halogen atom, a hydrocarbyl group having 1 to 20 carbon atoms, or a halogenated hydrocarbyl group having 1 to 20 carbon atoms; further preferably a $C_{1-20}$ fluorinated hydrocarbyl group containing one or more fluorine atoms; and particularly preferably a $C_{6-20}$ fluorinated aryl group containing one or more fluorine atoms.

Examples of the above-mentioned boron compound (1) are tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, and phenylbis(pentafluorophenyl) borane. Among them, most preferred is tris(pentafluorophenyl)borane.

Examples of an inorganic cation, $G^+$, in the above-mentioned boron compound (2) are a ferrocenium cation, an alkyl group-having ferrocenium cation, and a silver cation. An example of an organic cation, G+, therein is a barbenium cation such as a triphenylmethyl cation. Among them, G+ is preferably a carbenium cation, and particularly preferably a triphenylmethyl cation.

Examples of $(BQ^1Q^2Q^3Q^4)^-$ in the above-mentioned boron compound (2) are tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, and tetrakis(3,5-bistrifluoromethylphenyl)borate.

Examples of the above-mentioned boron compound (2) are lithium tetrakis(3,5-bistrifluoromethylphenyl)borate, sodium tetrakis(3,5-bistrifluoromethylphenyl)borate, potassium tetrakis(3,5-bistrifluoromethylphenyl)borate, silver tetrakis(pentafluorophenyl)borate, ferrocenium tetrakis(pentafluorophenyl)borate, 1,1'-dimethylferrocenium tetrakis(pentafluorophenyl)borate, tetrabutylphosphponium tetrakis(pentafluorophenyl)borate, tetraphenylphosphponium tetrakis(pentafluorophenyl)borate, tetramethylammonium tetrakis(pentafluorophenyl)borate, trimethylsulphonuim tetrakis(pentafluorophenyl)borate, diphenyliodonium tetrakis(pentafluorophenyl)borate, triphenylcarbenium tetrakis(pentafluorophenyl)borate, and triphenylcarbenium tetrakis(3,5-bistrifluoromethylphenyl)borate. Among them, most preferred is triphenylcarbenium tetrakis(pentafluorophenyl)borate.

Examples of (J-H)+ in the above-mentioned boron compound (3) are a trialkylammonium, an N,N-dialkylanilinium, a dialkylammonium, and a triarylphosphonium. Examples of the $(BQ^1Q^2Q^3Q^4)^-$ therein are the same as those mentioned above.

Examples of the above-mentioned boron compound (3) are triethylammonium tetrakis(pentafluorophenyl)borate, tripropylammonium tetrakis(pentafluorophenyl)borate, tri(n-butyl)ammonium tetrakis(pentafluorophenyl)borate, tri(n-butyl)ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-dimethyl-2,4,6-trimethylanilinium tetrakis(pentafluorophenyl)borate, N,N-dimethylanilinium tetrakis (3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl) phosphonium tetrakis(pentafluorophenyl)borate, and tri(dimethylphenyl)phosphonium tetrakis(pentafluorophenyl) borate. Among them, most preferred is tri(n-butyl)ammonium tetrakis(pentafluorophenyl)borate, or N,N-dimethylanilinium tetrakis(pentafluorophenyl)borate.

The boron compound is preferably the above-mentioned boron compound (2) or (3), and particularly preferably triphenylcarbenium tetrakis(pentafluorophenyl)borate, tri(n-butyl)ammonium tetrakis(pentafluorophenyl)borate, or N,N-dimethylanilinium tetrakis(pentafluorophenyl)borate.

A molecular weight of the polymer of the present invention is not particularly limited. Its weight-average molecular weight (Mw) is preferably 1,000 to 10,000,000, more preferably 2,000 to 5,000,000, and most preferably 4,000 to 3,000,000.

A molecular weight distribution of the polymer of the present invention is not particularly limited. It is preferably 1.0 to 100, more preferably 1.0 to 50, and most preferably 1.0 to 20.

A glass-transition temperature or a melting point of the polymer of the present invention is preferably −20° C. or higher, more preferably 20° C. or higher, and most preferably 50° C. or higher.

In the present invention, a method for contacting (i) the above-mentioned transition metal compound, (ii) the above-mentioned organoaluminum compound and/or boron compound, (iii) the compound represented by the formula (3), and (iv) the above-mentioned olefin, with one another, is not particularly limited.

When forming a polymerization catalyst by contacting the transition metal compound with the organoaluminum compound, the organoaluminum compound is preferably the above-mentioned cyclic alumoxane, linear alumoxane, or a combination thereof, in order to form a high activity-having polymerization catalyst. When forming a polymerization catalyst by contacting the transition metal compound, the organoaluminum compound and the boron compound with one another, the organoaluminum compound is preferably the organoaluminum compound represented by the above-mentioned first formula, $E_d^1 AlZ_{3-d}$, in order to form a high activity-having polymerization catalyst.

The organoaluminum compound is used in amount of generally 0.1 to 10,000 parts by mol, and preferably 5 to 2,000 parts by mol, per one mol of the transition metal compound. The amount of smaller than 0.1 part by mol may result in an insufficient activity of a polymerization catalyst. The amount of larger than 10,000 parts by mol may result in production of a too low molecular weight-having polymer, because of, for example, chain transfer to the organoaluminum compound, or may result in a too low activity-having polymerization catalyst. The boron compound is used in amount of generally 0.01 to 100 parts by mol, and preferably 0.5 to 10 parts by mol, per one mol of the transition metal compound. The amount of smaller than 0.01 part by mol may result in an insufficient activity of a polymerization catalyst. The amount of larger than 100 parts by mol is not preferable from an economical point of view.

Each of the transition metal compound, the organoaluminum compound, and the boron compound may be used as a solution thereof. Examples of a solvent for the solution are methylene chloride, chloroform, toluene, pentane, hexane, and heptane. Among them, preferred is methylene chloride, chloroform, or toluene.

A solution of the transition metal compound has a concentration of generally 0.01 to 500 µmol/L, preferably 0.05 to 100 µmol/L, and more preferably 0.05 to 50 µmol/L. A solution of the organoaluminum compound has a concentration of generally 0.01 to 10,000 µmol/L, preferably 0.1 to 5,000 µmol/L, and more preferably 0.1 to 2,000 µmol/L, in terms of an amount of an aluminum atom contained in the solution. A solution of the boron compound has a concentration of generally 0.01 to 500 µmol/L, preferably 0.05 to 200 µmol/L, and more preferably 0.05 to 100 µmol/L. When the solution of the transition metal compound has a concentration of lower than 0.01 µmol/L, when the solution of the organoaluminum compound has a concentration of lower than 0.01 µmol/L in terms of an amount of an aluminum atom contained in the solution, or when the solution of the boron compound has a concentration of lower than 0.01 µmol/L, a large amount of a solvent is necessary to prepare the solution, which is not preferable from an economical point of view. When the solution of the transition metal compound has a concentration of higher than 500 µmol/L, when the solution of the organoaluminum compound has a concentration of higher than 10,000 µmol/L in terms of an amount of an aluminum atom contained in the solution, or when the solution of the boron compound has a concentration of higher than 500 µmol/L, the transition metal compound, the organoaluminum compound, or the boron compound may not be sufficiently dissolved in a solvent, and therefore, the compound may be deposited in the solution.

A polymerization catalyst in the present invention may be combined with a carrier or a support comprising particles of inorganic or organic compounds. Examples of the inorganic compounds are silica gel and alumina, and an example of the organic compounds is a styrene unit-containing polymer.

A polymerization method is not particularly limited in the present invention. Examples thereof are a gas-phase polymerization method, a bulk polymerization method, a solution polymerization method using a suitable polymerization solvent, and a suspension polymerization method using the same, which are a batch-wise polymerization method or a continuous polymerization method. The polymerization solvent is a solvent non-deactivating a polymerization catalyst. Examples of the solvent are a hydrocarbon solvent such as benzene, toluene, pentane, hexane, heptane, and cyclohexane; and a halogenated solvent such as dichloromethane and chloroform.

A polymerization temperature is not particularly limited in the present invention, and generally −100 to 250° C., and preferably −50 to 200° C. The polymerization temperature of lower than −100° C. may result in an insufficient activity of a polymerization catalyst. The polymerization temperature of higher than 250° C. may result in production of a too low molecular weight-having polymer, or may result in no production of a polymer containing the unit represented by the formula (1), due to occurrence of a side reaction such as an isomerization reaction.

In order to regulate a molecular weight of a polymer produced, a chain transfer agent such as hydrogen may be used.

A polymerization time is not particularly limited in the present invention, and generally one minute to 72 hours. The polymerization time of shorter than one minute may result in an insufficient yield of a polymer produced. The polymerization time of longer than 72 hours is disadvantageous from an economical point of view.

The polymer of the present invention may be used in combination with various additives such as weatherability stabilizers, lubricants, pigments, dyes, antistatic agents, antioxidants, antifogging agents, rust-inhibiting agents, surfactants, and electroconductive agents. The polymer of the present invention may also be used in combination with a polymer known in the art such as a low-density polyethylene, a high-density polyethylene, a linear low-density polyethylene, an ethylene-acrylic acid ester copolymer, an ethylene-methacrylic acid ester copolymer, an ethylene-vinyl acetate copolymer, an ethylene-α-olefin copolymer elastomer, and polypropylene.

The polymer of the present invention can be molded according to an extrusion molding method or an injection molding method. Those methods may be known in the art. Examples of the extrusion molding method are (1) an inflation molding method comprising the steps of (1-1) extruding a molten resin through a circular die, thereby forming an extruded product, (1-2) blowing the extruded product into a cylindrical film or sheet, and (1-3) rewinding the film or sheet, (2) a T-die molding method comprising the steps of (2-1) extruding a molten resin through a linear die, thereby forming a film or sheet, and (2-2) rewinding the film or sheet, and (3) a calender molding method.

EXAMPLE

The present invention is explained with reference to the following Examples, which do not limit the scope of the present invention.

Reference Example 1

Preparation of 9,9-diallylfluorene represented by the formula (3)

There were put 10 g of fluorene manufactured by Wako Pure Chemical Industries, Ltd. and 10.1 g of potassium tert-butoxide manufactured by Aldrich Chemical Company in a 200 mL-round bottom flask, and 120 mL of dry N,N-dimethylformaide manufactured by Wako Pure Chemical Industries, Ltd. were added thereto. While stirring the resultant mixture in a nitrogen atmosphere at 50° C., 5.86 mL of allyl chloride manufactured by Kanto Chemical Co., Inc. were added dropwise thereto over 2 hours. The mixture was stirred at 50° C. for 8 hours. Additional 10.1 g of potassium tert-butoxide manufactured by Aldrich Chemical Company were added thereto, and then additional 5.86 mL of allyl chloride manufactured by Kanto Chemical Co., Inc. were added dropwise thereto over 2 hours. The mixture was stirred overnight at 50° C. The obtained reaction mixture was added to 900 mL of water, and then 300 mL of hexane were added thereto. The organic layer thereof was subjected to extraction with ether three times, and the extract was washed with water four times. The washed extract was further washed with diluted hydrochloric acid, and then with water in this order. The further washed extract was dried over anhydrous magnesium sulfate manufactured by Nacalai Tesque, Inc. The dried extract was subjected to removal of the solvent by distillation, and the resultant liquid was distilled in vacuo, thereby obtaining 12.8 g 9,9-diallylfluorene at 90° C. under 4 mmHg as yellow oil.

Reference Example 2

Preparation of 9-allyl-9-((2E)-2-butenyl)-fluorene represented by the formula (3)

There were put 2.5 g of 9-allylfluorene and 31.3 mL of dry tetrahydrofuran manufactured by Kanto Chemical Co., Inc. in a 100 mL-three necked flask. There were added dropwise thereto at 0° C. over 30 minutes 9 mL of a hexane solution of n-butyllithium (concentration: 1.6 M) manufactured by Kanto Chemical Co., Inc. The resultant mixture was stirred for 2 hours at room temperature, and then 1.4 mL of trans-crotyl chloride manufactured by Aldrich Chemical Company was added dropwise thereto at 0° C. The temperature of the mixture was raised gradually up to room temperature, and then the mixture was stirred for 6 hours at room temperature. Water was added to the reaction mixture, and the obtained mixture was subjected to extraction with ether. The extract was washed with water and with a saline solution in this order. The washed extract was dried over anhydrous magnesium sulfate manufactured by Nacalai Tesque, Inc. The dried extract was subjected to removal of the solvent by distillation, and the resultant liquid was distilled in vacuo, thereby obtaining 2.43 g of 9-allyl-9-((2E)-2-butenyl)-fluorene at 155° C. under 4 mmHg.

Example 1

There were put 6.60 mg of chloro(methyl)[N,N'-(1,2-dihydroacenaphthylen-1,2-diylidene)bis(2,6-diisopropylaniline- κN)]palladium (transition metal compound) prepared according to a method disclosed in Recueil des Travaux Chimiques de Pays-Bas, Vol. 113, page 88 (1994), and 10.6 mg of sodium tetrakis(3,5-bistrifluoromethylphenyl)borate (boron compound) prepared according to a method disclosed in Organometallics, Vol. 11, page 3920 (1992), in a 25 mL-Schlenk tube. There was added thereto 0.5 mL of dry methylene chloride manufactured by Kanto Chemical Co., Inc., and the resultant mixture was stirred for 30 minutes. There was added thereto 0.172 g of 9,9-diallylfluorene prepared in Reference Example 1, and the mixture was stirred at room temperature for 5 minutes, thereby obtaining 0.093 g of a homopolymer of 9,9-diallylfluorene having units represented by the formula (1).

The homopolymer was soluble in chloroform. The homopolymer had a number-average molecular weight (Mn) of 17,800; a molecular weight distribution (Mw/Mn) of 2.0; 100% by mol of a trans-form in view of its relative configuration between $A^7$ and $A^8$; no stereoregularity; a glass-transition temperature of 154° C. in a range between 0° C. and 200° C.; and a refractive index of 1.67. Results are shown in Table 1.

The above-mentioned number-average molecular weight (Mn) and molecular weight distribution (Mw/Mn) were measured under the following conditions according to a gel permeation chromatography (GPC) using an equipment manufactured by JASCO Corporation having a degasser (DG-980-50), a pump (PU-980), an auto-sampler (AS-950), a column oven (CO-966), an RI detector (RI-930) and a UV detector (UV-975), with a calibration curve prepared using standard polystyrenes:
  two columns, SHODEX-806L, manufactured by Showa Denko K.K.;
  measurement temperature of 40° C.;
  solvent of chloroform; and
  sample concentration of 1 mg-sample/mL-solution.

The above-mentioned proportion of the trans-form was measured under the following conditions according to a $^{13}$C-NMR method using an equipment, LA-500, manufactured by JEOL LTD; and the above-mentioned existence of the unit represented by the formula (1) was confirmed by assigning signals in the range of 23 to 50 ppm of a $^{13}$C-NMR spectrum obtained by the $^{13}$C-NMR method to a linear hydrocarbyl structure and a 5-membered hydrocarbyl structure contained in the unit represented by the formula (1):
  measurement solvent of chloroform-$d_1$;
  measurement temperature of room temperature;
  sample concentration of 50 mg-sample/0.5 mL-solution; and
  reference material of chloroform-$d_1$ (77 ppm).

The above-mentioned stereoregularity was measured using an equipment, LA-500, manufactured by JEOL LTD according to a $^{13}$C-NMR method comprising the steps of:
  (1) preparing a solution of a polymer in chloroform-$d_1$ having a concentration of preferably 286 mg/mL;
  (2) measuring a $^{13}$C-NMR spectrum of the solution;
  (3) obtaining a peak area ($A_1$) existing in a range of 46.2 to 46.6 ppm in the spectrum, and a peak area ($A_2$) existing in a range of 46.9 to 47.3 ppm therein, respectively, provided that a peak assigned to chloroform-$d_1$ appears at 77 ppm; and
  (4) calculating the stereoregularity based on the following formulas, $$\text{threodiisotactic triad (\%)} = 100 A_1/(A_1 + A_2)$$

$$\text{threodisyndiotactic triad (\%)} = 100 A_2/(A_1 + A_2).$$

The above-mentioned glass-transition temperature was measured according to a differential scanning calorimetry (DSC) using an equipment, SSC-5200, manufactured by Seiko Instruments & Electronics Ltd. under the following conditions:
  heating from 25° C. to 135° C. at a rate of 10° C./minute, and keeping at 135° C. for 5 minutes; then,
  cooling from 135° C. to −60° C. at a rate of 20° C./minute, and keeping at −60° C. for 5 minutes; and then,
  measuring under heating from −60° C. to 150° C. at a rate of 10° C./minute.

The above-mentioned refractive index was measured under the following conditions with an Abbe refractometer manufactured by ATAGO CO., LTD.
  measuring wavelength of D line (587.56 nm), and
  measuring temperature of 23° C.,
wherein the sample (homopolymer) was directly contacted with a measuring surface using no contact liquid.

Example 2

Example 1 was repeated except that (i) the transition metal compound was changed to 6.3 mg of chloro(methyl)[N,N′-(1,2-dihydroacenaphthylen-1,2-diylidene)bis(2,6-dichloroaniline-κN)]palladium (transition metal compound) prepared according to a method disclosed in Recueil des Travaux Chimiques de Pays-Bas, Vol. 113, page 88 (1994), (ii) the 30 minute-stirring after addition of dry methylene chloride was changed to 10 minutes, (iii) 9,9-diallylfluorene was changed to 182.2 mg of 9-allyl-9-((2E)-2-butenyl)-fluorene prepared in Reference Example 2, and (iv) the polymerization time of 5 minutes was changed to 24 hours, thereby obtaining 71 mg of a homopolymer of 9-allyl-9-((2E)-2-butenyl)-fluorene having units represented by the formula (1).

The homopolymer was soluble in chloroform, methylene chloride or tetrahydrofuran, and was insoluble in hexane or methanol. The homopolymer had a number-average molecular weight (Mn) of 5,500; a molecular weight distribution (Mw/Mn) of 2.2; 100% by mol of a trans-form in view of its relative configuration between $A^7$ and $A^8$; no stereoregularity; and a glass-transition temperature of 142° C. in a range between 30° C. and 200° C. Results are shown in Table 1.

Example 3

There were put 6.0 mg of 2,6-bis-[1-(2,6-dimethylphenylimino)ethyl]pyridineiron dichloride (transition metal compound) prepared according to a method disclosed in Journal of The American Chemical Society, Vol. 121, pages 8728-8740 (1999) in a 25 mL-Schlenk tube. There were added thereto 0.92 mL of purified toluene, 295 mg of 9,9-diallylfluorene prepared in Reference Example 1, and 0.28 mL of a toluene solution of modified methylaluminoxane (MMAO: organoaluminum compound), in this order, the toluene solution having an aluminum concentration of 6.6% by weight, and a trade name of MMAO-3A manufactured by Tosohfinechem. The resultant mixture was stirred for 5 hours at room temperature to polymerize the monomer. The reaction mixture was poured into an excess amount of a hydrochloric acid-methanol mixed solution to obtain white powder. The white powder was washed with methanol, thereby obtaining 281 mg of a homopolymer of 9,9-diallylfluorene having units represented by the formula (1).

The homopolymer had a number-average molecular weight (Mn) of 23,400 measured according to an NMR method; 35% by mol of a cis-form in view of its relative configuration between $A^7$ and $A^8$; no stereoregularity; a glass-transition temperature of 155° C. in a range between −100° C. and 250° C.; and no melting point. Results are shown in Table 1.

The above-mentioned number-average molecular weight (Mn) was measured using an equipment, LA-500, manufactured by JEOL LTD according to a $^{13}$C-NMR method under the following conditions:

measurement solvent of chloroform-d$_1$;
measurement temperature of room temperature;
sample concentration of 50 mg-sample/0.5 mL-solution; and
reference material of chloroform-d$_1$ (77 ppm).

TABLE 1

| | Example | | |
|---|---|---|---|
| | 1 | 2 | 3 |
| Polymerization condition | | | |
| Transition metal compound (Notre 1) | TM-1 | TM-2 | TM-3 |
| Stirring time after addition of CH$_2$Cl$_2$ (min) | 30 | 10 | — |
| Monomer (Note 2) | M-1 | M-2 | M-1 |
| Polymerization time | 5 min | 24 hrs | 5 hrs |
| Result | | | |
| Solubility | | | |
| Chloroform | soluble | soluble | — |
| Methylene chloride | — | soluble | — |
| Tetrahydrofuran | — | soluble | — |
| Hexane | — | insoluble | — |
| Methanol | — | insoluble | — |
| Mn | 17,800 | 5,500 | 23,400 |
| Mw/Mn | 2.0 | 2.2 | — |
| Relative configuration between A$^7$ and A$^8$ (% by mol) | trans/100 | trans/100 | cis/35 |
| Stereoregularity | no | no | no |
| Tg (° C.) | 154 | 142 | 155 |
| Melting point | — | — | no |
| Refractive index | 1.67 | — | — |

(Notre 1):
TM-1 is chloro(methyl)[N,N'-(1,2-dihydroacenaphthylen-1,2-diylidene)bis(2,6-diisopropylaniline-κN)]palladium.
TM-2 is chloro(methyl)[N,N'-(1,2-dihydroacenaphthylen-1,2-diylidene)bis(2,6-dichloroaniline-κN)]palladium.
TM-3 is 2,6-bis-[1-(2,6-dimethylphenylimino)ethyl]pyridineiron dichloride.
(Note 2):
M-1 is 9,9-diallylfluorene.
M-2 is 9-allyl-9-((2E)-2-butenyl)-fluorene.

The invention claimed is:

1. A polymer containing units represented by the following formula (1):

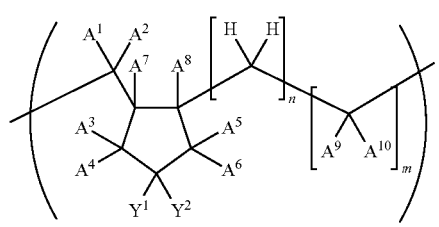

(1)

wherein Y$^1$ is an aryl group, and Y$^2$ is an aryl group, a hydrogen atom, a halogen atom, an alkyl group, an aralkyl group, a silyl group, a siloxy group, an alkoxy group, an aralkyloxy group, an aryloxy group, an amino group, an amide group, an imide group, or a hydrocarbylthio group; Y$^1$ and Y$^2$ may be linked with each other to form a ring; A$^1$, A$^2$, A$^3$, A$^4$, A$^5$, A$^6$, A$^7$, A$^8$, A$^9$ and A$^{10}$ are independently of one another a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group; m is 0 or 1; and n is an integer of 1 to 20.

2. The polymer according to claim 1, wherein the units represented by the formula (1) contain units represented by the following formula (2), whose relative configuration between A$^7$ and A$^8$ is a trans-form:

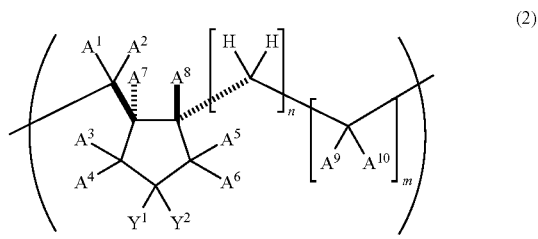

(2)

wherein all the symbols contained in the formula (2) are the same as those defined in the formula (1).

3. The polymer according to claim 1, wherein the polymer is a polymer having more than 25% by mol of threodiisotactic triad, the total amount of the unit represented by the formula (1) being 100% by mol.

4. The polymer according to claim 1, wherein the polymer is a polymer having more than 25% of erythrodiisotactic triad, the total amount of the unit represented by the formula (1) being 100% by mol.

5. The polymer according to claim 1, wherein the polymer is a polymer having more than 25% of a threodisyndiotactic triad, the total amount of the unit represented by the formula (1) being 100% by mol.

6. The polymer according to claim 1, wherein the polymer is a polymer having more than 25% of an erythrodisyndiotactic triad, the total amount of the unit represented by the formula (1) being 100% by mol.

7. A process for producing a polymer having a repeating unit represented by the following formula (1), which comprises the step of polymerizing a compound represented by the following formula (3):

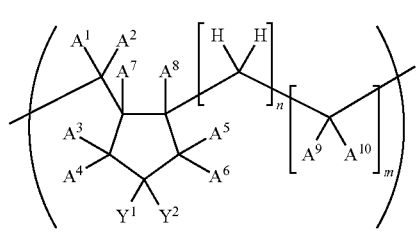

(1)

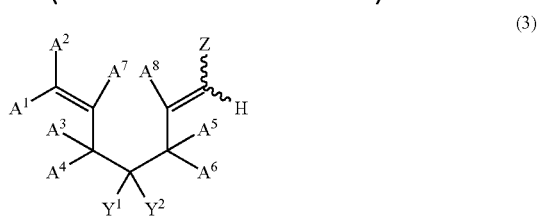

(3)

wherein Y$^1$ is an aryl group, and Y$^2$ is an aryl group, a hydrogen atom, a halogen atom, an alkyl group, an aralkyl group, a silyl group, a siloxy group, an alkoxy group, an aralkyloxy group, an aryloxy group, an amino group, an amide group, an imide group, or a hydrocarbylthio group; $Y^1$ and $Y^2$ may be linked with each other to form a ring; $A^1, A^2, A^3, A^4, A^5, A^6, A^7, A^8, A^9$ and $A^{10}$ are independently of one another a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group; Z is a group of $-(CH_2)_{n-1}-(CA^9A^{10})_m H$; two wavy lines displayed in the upper right of the formula (3) mean variety in their configuration; m is 0 or 1; and n is an integer of 1 to 20.

8. The process for producing a polymer according to claim 7, wherein the polymerization is carried out in the presence of a polymerization catalyst formed by contacting a transition metal compound with an organoaluminum compound and/or boron compound.

9. The process for producing a polymer according to claim 8, wherein the transition metal compound is a compound represented by the following formula [I]:

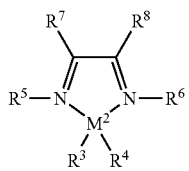

[I]

wherein $M^2$ is a transition metal atom of Group 10 of the Periodic Table of the elements; $R^3$ and $R^4$ are independently of each other a hydrogen atom, a halogen atom, an alkyl group, an aralkyl group, an aryl group, a silyl group, a siloxy group, an alkoxy group, an aralkyloxy group or an aryloxy group; $R^5$ and $R^6$ are independently of each other a hydrocarbyl group having 1 to 30 carbon atoms; and $R^7$ and $R^8$ are independently of each other a hydrogen atom or a hydrocarbyl group having 1 to 20 carbon atoms, and $R^7$ and $R^8$ may be linked with each other to form a ring.

10. The process for producing a polymer according to claim 8, wherein the transition metal compound is a compound represented by the following formula [II]:

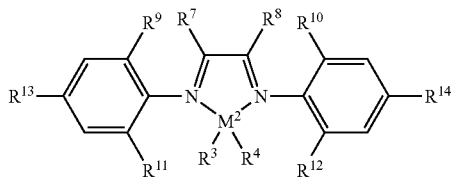

[II]

wherein $M^2, R^3, R^4, R^7$ and $R^8$ are the same as those defined in the formula [I]; $R^9$ and $R^{10}$ are independently of each other a hydrogen atom, a halogen atom, an alkyl group, an aralkyl group, a silyl group, a siloxy group, an alkoxy group, an aralkyloxy group, an amino group, an amide group, an imide group, or a hydrocarbylthio group; $R^{11}$ and $R^{12}$ are independently of each other an aryl group having 7 to 20; and $R^{13}$ and $R^{14}$ are independently of each other a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group.

11. The process for producing a polymer according to claim 8, wherein the transition metal compound is a compound represented by the following formula [III]:

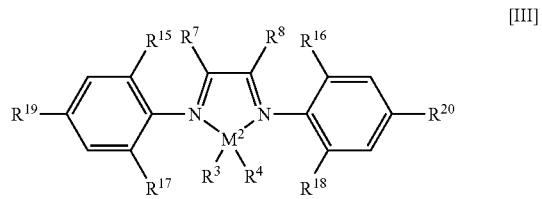

[III]

wherein $M^2, R^3, R^4, R^7$ and $R^8$ are the same as those defined in the formula [I]; $R^{15}, R^{16}, R^{17}$ and $R^{18}$ are independently of one another a hydrogen atom, a halogen atom, an alkyl group, an aralkyl group, an aryl group having 6 carbon atoms, a silyl group, a siloxy group, an alkoxy group, an aralkyloxy group, an aryloxy group, an amino group, an amide group, an imide group, or a hydrocarbylthio group; and $R^{19}$ and $R^{20}$ are independently of each other a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group.

12. The process for producing a polymer according to claim 8, wherein the transition metal compound is a compound represented by the following formula [IV]:

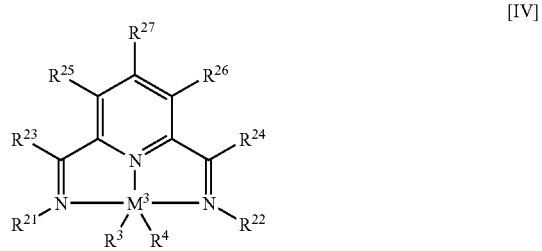

[IV]

wherein $M^3$ is a transition metal atom of Group 8 to 11 of the Periodic Table of the elements; $R^3$ and $R^4$ are the same as those defined in the formula [I]; and $R^{21}$ to $R^{27}$ are independently of one another a hydrogen atom, a halogen atom, an alkyl group, an aralkyl group, an aryl group, a silyl group, a siloxy group, an alkoxy group, an aralkyloxy group, an aryloxy group, an amino group, an amide group, an imide group, or a hydrocarbylthio group, and any two or more of $R^{21}$ to $R^{27}$ may be linked with one another to form a ring.

* * * * *

UNITED STATES PATENT AND TRADEMARK OFFICE
CERTIFICATE OF CORRECTION

| | |
|---|---|
| PATENT NO. | : 7,956,145 B2 |
| APPLICATION NO. | : 11/958905 |
| DATED | : June 7, 2011 |
| INVENTOR(S) | : Kohtaro Osakada et al. |

It is certified that error appears in the above-identified patent and that said Letters Patent is hereby corrected as shown below:

Title Page, item (73) "Assignee", should be listed as:

-- Sumitomo Chemical Company, Limited, Tokyo (JP) and
Tokyo Institute of Technology, Tokyo (JP) --.

Signed and Sealed this
Seventh Day of February, 2012

David J. Kappos
*Director of the United States Patent and Trademark Office*